(12) United States Patent
Porter

(10) Patent No.: US 7,321,939 B1
(45) Date of Patent: Jan. 22, 2008

(54) ENHANCED DISTRIBUTED EXTRACT, TRANSFORM AND LOAD (ETL) COMPUTER METHOD

(75) Inventor: Duane L. Porter, Blue Springs, MO (US)

(73) Assignee: Embarq Holdings Company LLC, Overland Park, KS (US)

( * ) Notice: Subject to any disclaimer, the term of this patent is extended or adjusted under 35 U.S.C. 154(b) by 1092 days.

(21) Appl. No.: 10/607,788

(22) Filed: Jun. 27, 2003

(51) Int. Cl.
*G06F 15/173* (2006.01)

(52) U.S. Cl. ............... 709/238; 709/217; 709/226; 709/229

(58) Field of Classification Search ........ 709/217–219, 709/223, 226, 229, 238, 239
See application file for complete search history.

(56) References Cited

U.S. PATENT DOCUMENTS

| | | | |
|---|---|---|---|
| 6,377,993 B1 | 4/2002 | Brandt et al. | |
| 6,604,104 B1 | 8/2003 | Smith | |
| 6,704,768 B1 | 3/2004 | Zombek et al. | |
| 6,714,979 B1 | 3/2004 | Brandt et al. | |
| 6,850,947 B1 | 2/2005 | Chung et al. | |
| 6,886,044 B1 * | 4/2005 | Miles et al. ............... | 709/238 |
| 7,146,399 B2 * | 12/2006 | Fox et al. ................. | 709/203 |
| 7,203,753 B2 * | 4/2007 | Yeager et al. ............. | 709/225 |
| 7,222,187 B2 * | 5/2007 | Yeager et al. ............. | 709/237 |
| 7,237,037 B2 * | 6/2007 | Wells et al. ............... | 709/246 |
| 2004/0003064 A1 * | 1/2004 | Astley e al. .............. | 709/223 |
| 2005/0086300 A1 * | 4/2005 | Yeager et al. ............. | 709/204 |

FOREIGN PATENT DOCUMENTS

| | | |
|---|---|---|
| EP | 1 016 989 A2 | 7/2000 |
| EP | 1016989 A2 | 7/2000 |

OTHER PUBLICATIONS

"IBM's Business Integration with MQSeries and MQSeries Integrator," www.software.ibm.com/tx/mqseries/busint, pp. 1-9, no date.

(Continued)

*Primary Examiner*—Saleh Najjar
*Assistant Examiner*—Liang-che Alex Wang
(74) *Attorney, Agent, or Firm*—Patton Boggs LLP

(57) ABSTRACT

A method for delivering information to information targets within a computing environment having multiple platforms includes extracting information from an information source, transforming the extracted information, and isolating the transformed information by wrapping the transformed information into a message envelope having a standard format. The message envelope is routed to at least one information target on the same platform where the message envelope is targeted to an information target on the same platform as the router. The message envelope is routed to a second router acting as a router broker where the message envelope is targeted to an information target on a different platform than the router. The router broker routes the message envelope to at least a third router located on the platform with an information target; the third router routing the message envelope to at least one information target on its platform. The message envelope is unwrapped to reveal the transformed information that is then loaded into the information target.

15 Claims, 13 Drawing Sheets

OTHER PUBLICATIONS

"MQSeries Integrator Verison 2.0 Technical White Paper," www.ibm.com/software/tx/mqseries/, pp. 1-29, no date.

Feetham, Tim, "The Imperatives of Real-Time Warehousing," The Data Warehousing Institute, pp. 1-5, no date.

"Transforming the Financial Commerce Chain," Mercator, pp. 1-8, no date.

"Executive Overview: Managing Real World B2B Integratiion,"Vitra Technology, Inc., pp. 1-11, no date.

U.S. Appl. No. 09/843,682, filed Apr. 27, 2001 and entitled "Distributed Extract Transfer, and Load (ETL) Computer Method."

"IBM's Business Integration with MQSeries and MQSeries Integrator," pp. 1-9, www.software.ibm.com/tx/mqseries/busint, no date.

"MQSeries Integrator Version 2.0 Technical White Paper," pp. 1-29, www.ibm.com/software/tx/mqseries/, no date.

Feetham, Tim, "The Imperatives of Real-Time Warehousing," pp. 1-5, The Data Warehousing Institute, no date.

"Transforming the Financial Commerce Chain," pp. 1-8, Mercator, no date.

"Executive Overview: Managing Real World B2B Integration," pp. 1-11, Vitria Technology, Inc, no date.

Duane L. Porter, et al., *Distributed Extract, Transfer, and Load (ETL) Computer Method*, Filing Date—Apr. 27, 2001, U.S. Appl. No. 09/843,682, Specification (29 pgs.) and Drawings (10 sheets, Figs. 1-10).

\* cited by examiner

Figure 11. Routing / Queue Elements & Location

Figure 12. Source and Target Spoke Components

ENHANCED DISTRIBUTED EXTRACT, TRANSFORM AND LOAD (ETL) COMPUTER METHOD

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This disclosure relates to a distributed extract, transform, and load (ETL) computer method (hereinafter referred to as Distributed ETL) for linking together multiple information domains residing across an enterprise-wide computing environment in order to share corporate information, while reducing the time required to deliver that information. The disclosure addresses the many-to-many relationships that exist between information sources and targets residing within each domain by implementing a central router to deliver information to and from these domains.

BACKGROUND OF THE INVENTION

Today, better integration of business information systems throughout the enterprise and incorporating more recent database management technologies results in real managerial competitive advantages. Information to support management decision making typically is extracted from operations systems and loaded into a data warehouse. Information as used herein includes data internal to a corporation that is generated in the day-to-day business operations of the corporation, aggregations and summaries of the internal data, and external information such as demographic and geospatial data that can be related to the internal data. A data warehouse is a large storage facility within the information technology, IT, system that typically holds the current and historical information across an entire enterprise. It most likely consists of numerous databases and may exist on multiple platforms (operating systems). A database can be defined as a collection of information organized in such a way that a computer program can quickly select desired pieces of data. One can think of a database as an electronic filing system.

In the past, it was only viewed as necessary to capture periodic data extracts supplied by operational computing systems to update the data warehouse on a weekly or monthly basis. Strategic dependence on data warehousing was viewed as long-term and historical, not as a real time activity. In contrast, today's business environment is worldwide and does not stop at five o'clock P.M. For example, the Internet allows commerce to continue 24 hours a day, seven days a week. As a result, customer service support and normal telephony operations within many business organizations likewise operate around the clock.

Furthermore, marketing practices have evolved from mass media advertising to more personalized target marketing, which cuts expenses while providing customized treatment. To enable customized marketing, companies must know and understand their customers. Much of this understanding is made possible through groups such as Decision Support Services (DSS), the business group within an enterprise that has traditionally supported data warehousing. To be effective in supporting the extended operating and marketing efforts of an enterprise, information should be processed and pushed back from DSS into the customer contact areas such as customer service support, telemarketing and advertising campaign management as rapidly as possible. Thus, it is preferred that DSS be capable of receiving, processing, and providing information on an ongoing, near real time basis.

This disclosure, referred to as Distributed ETL, improves on current DSS services by providing many of the advantages of scalability of an extract, transform and load (ETL) application and the near real time event processing of an enterprise application integration (EAI) application while reducing or eliminating some of the disadvantages associated with each.

SUMMARY OF THE INVENTION

The present invention is a method for delivering information to information targets within a computing environment having multiple platforms. The method can consist of extracting information from an information source, transforming the extracted information, and isolating the transformed information by wrapping the transformed information into a message envelope having a standard format. The message envelope is then delivered to a router on a platform. If the message envelope is targeted to an information target on the same platform as the router, the message envelope is routed to an information target on the same platform. If the message envelope is targeted to an information target on a different platform than the router, the message envelope is routed to a second router acting as a router broker. The router broker then routes the message envelope to a third router located on the platform with the information target. The third router routes the message envelope to an information target on its platform. The message envelope is then unwrapped to reveal the transformed information, which is then loaded into the information target. The extraction, transformation, and isolation steps can be isolated from the routing steps such that the extraction, transformation, and isolation steps can be executed simultaneously for multiple information sources distributed across the computing environment to produce multiple message envelopes. The subsequent steps can be repeated for each of the message envelopes.

In an alternative embodiment, the method can consist of extracting information from an information source, transforming the extracted information, and wrapping the transformed information into a message envelope having a standard format. The message envelope can then be delivered to a router on a platform. If the message envelope is targeted to an information target on the same platform as the router, the message envelope is routed to an information target on the same platform. If the message envelope is targeted to an information target on a different platform than the router, the message envelope is routed to a second router acting as a router broker. The router broker then routes the message envelope to a third router located on the platform with the information target. The third router routes the message envelope to an information target on its platform. The message envelope is then unwrapped to reveal the information received. The received information is mapped to a format required by the information target, transformed, and loaded into the information target. The extraction, transformation, and wrapping steps can be isolated from the routing steps such that the extraction, transformation, and wrapping steps can be executed simultaneously for multiple information sources distributed across the computing environment to produce multiple message envelopes. The subsequent steps can be repeated for each of the message envelopes.

During the extraction step, information can be either pulled or pushed from the information source. The extracted information can consist of content changes to the source information at the time the extraction step is performed as compared to the source information at a previous point in time. The transformation of the extracted information can consist of applying one or more business rules to modify the extracted information. The message envelope can consist of an identification of the information source, a content definition identification, and the content of the transformed information. After the unwrapping of the message envelope, the transformed information can be filtered prior to being loaded and a plurality of transformed information can be aggregated and loaded into the information target as a batch. The information target can consist of a data warehouse and a data mart.

An alternative embodiment is a method for delivering information from multiple information sources to multiple information targets within a computing environment. The method can consist of extracting information from two information sources. Information from the first information source is published to a first source spoke and information from the second information source is published to a second source spoke. The information emerging from the source spokes is routed to a first target spoke. The information from the two information sources is combined and published through the first target spoke, which now acts as a third source spoke. The information from the third source spoke is routed to a second target spoke and the information traveling through the second target spoke is received at a second information target which had subscribed to the combined information. Alternatively, information from the third source spoke can be routed to multiple target spokes and the information traveling through the multiple target spokes can be received by multiple information targets corresponding to the multiple spokes that had subscribed to the combined information. During the extraction step, information can be either pulled or pushed from the information sources.

In an alternative embodiment, when a massage envelope is targeted to an information target that is on a different platform than router is on and the message envelope is routed to a second router acting as a router broker, two options are available. If the message envelope is targeted to an information target on the same platform as the second router, the message envelope can be routed to an information target on the same platform. If the message envelope is targeted to an information target on a different platform than the second router, the message envelope can be routed to a third router located on the platform with the information target. The third router can then route the message envelope to an information target on its platform.

DETAILED DESCRIPTION OF THE INVENTION

Within the enterprise, information takes many forms depending on its usage. In other words, the business usage of the information drives its resultant structure. This information can be grouped into information domains according to its business usage or function as shown diagrammatically in FIG. 1. The information domains include operations 10 used for daily operation information such as on-line transaction processing (OLTP); exploration zones 120 which includes data mining; data warehouse 40 which is the consolidated information store; and summarized views 150 used for predefined queries and on-line analytical processing (OLAP) reports.

Figure 1:
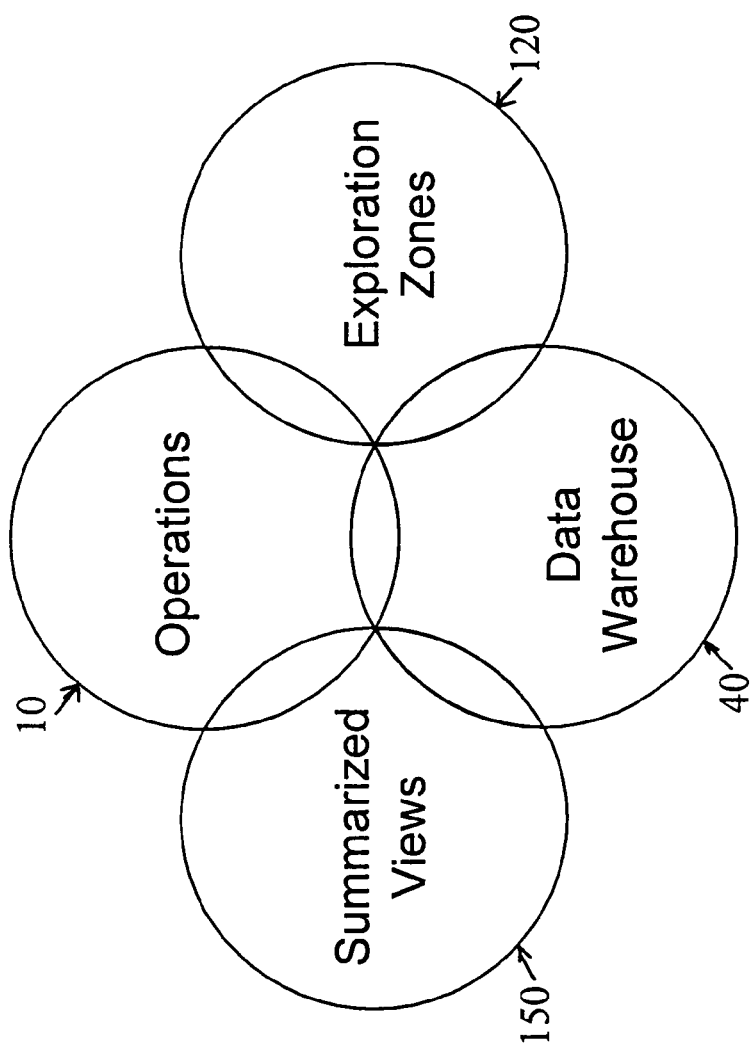
FIG. 1 is a diagrammatic representation of business information domains.

As shown in FIG. 1, the information domains overlap, indicating that the boundaries between business information domains are not absolutely crisp. Some warehouse information can be summarized, a characteristic of OLAP summary reporting, while OLAP tools sometimes drill down into detailed warehouse tables. Because of the differing data structures required to support the differing business uses for the data, the same information may be used for multiple business functions. Therefore, the information domains are interdependent upon each other. The relationship between information domains can become a complex web linking information sources and information targets. These relationships can be intermixed and multidirectional, thus defining a many-to-many relationship between business information domains. Current enterprise application integration (EAI) applications, such as IBM's MQ Series, Tibco's Rendezvous or Saga's Saga Vista, are available to coordinate information flow between information domains to facilitate business processes. These traditional EAI systems are synchronous, transaction driven systems that operate in real time or near-real time, but have certain other disadvantages (e.g., scalability limitations). An alternative tool is a standard extract, transform and load (ETL) application, which is an asynchronous, batch driven system that can be scaled up but typically suffers from delayed event processing.

Figure 2:
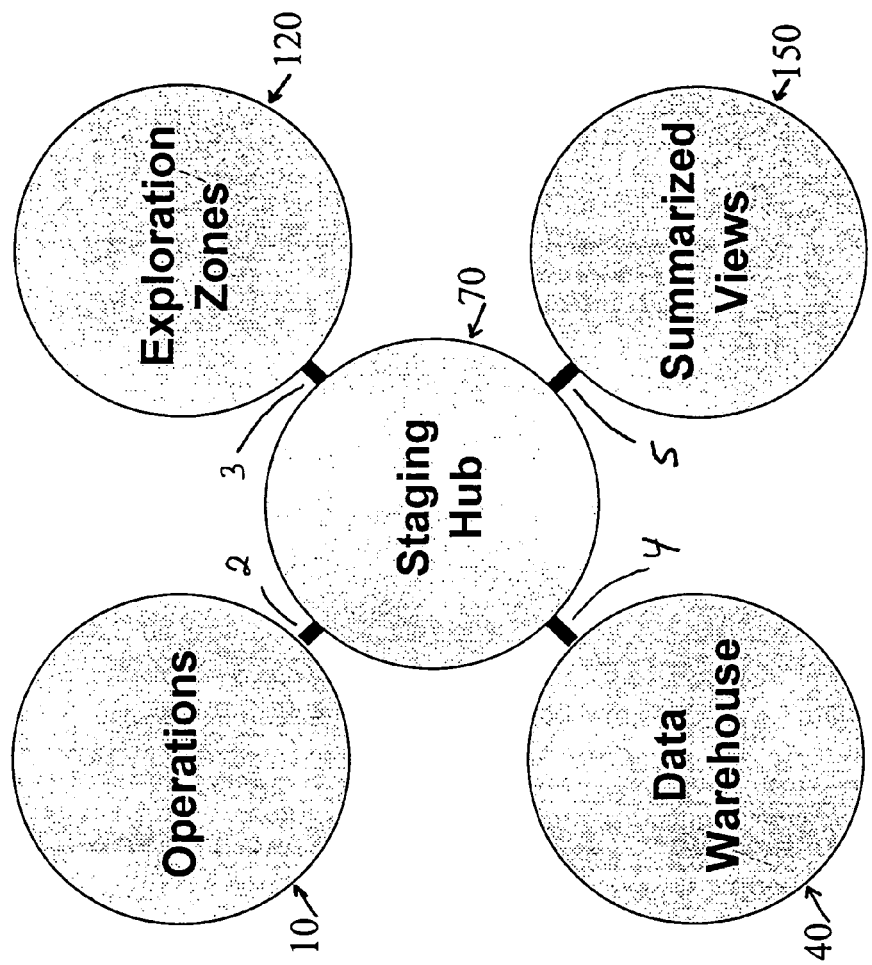
FIG. 2 is a diagrammatic representation of a basic hub and spoke architecture.

Traditional EAI applications direct the flow of information between domains through a center point called a hub, or more commonly a message broker to manage many-to-many relationships in a scalable manner. The hub and spoke architecture is applicable to managing ETL needs that exist between information domains as well. FIG. 2 is a diagrammatic representation of a basic hub and spoke architecture. The staging hub 70 is at the center of the hub and spoke figure with connecting spokes 2, 3, 4, and 5 to the various information domains, namely operations 10, exploration zones 120, data warehouse 40, and summarized views 150, respectively.

In contrast to the traditional EAI and standard ETL applications which rely on the basic hub and spoke architecture described above, this disclosure addresses a distributed extract, transform, and load (ETL) computer application to address the need for linking multiple information sources and targets together to deliver shared corporate information, while reducing the time required to deliver that information. The Distributed ETL overcomes the many-to-many relationships that exist between information sources and targets by implementing a spartan central router passing information to and from these domains through "thick spokes."

Figure 3:
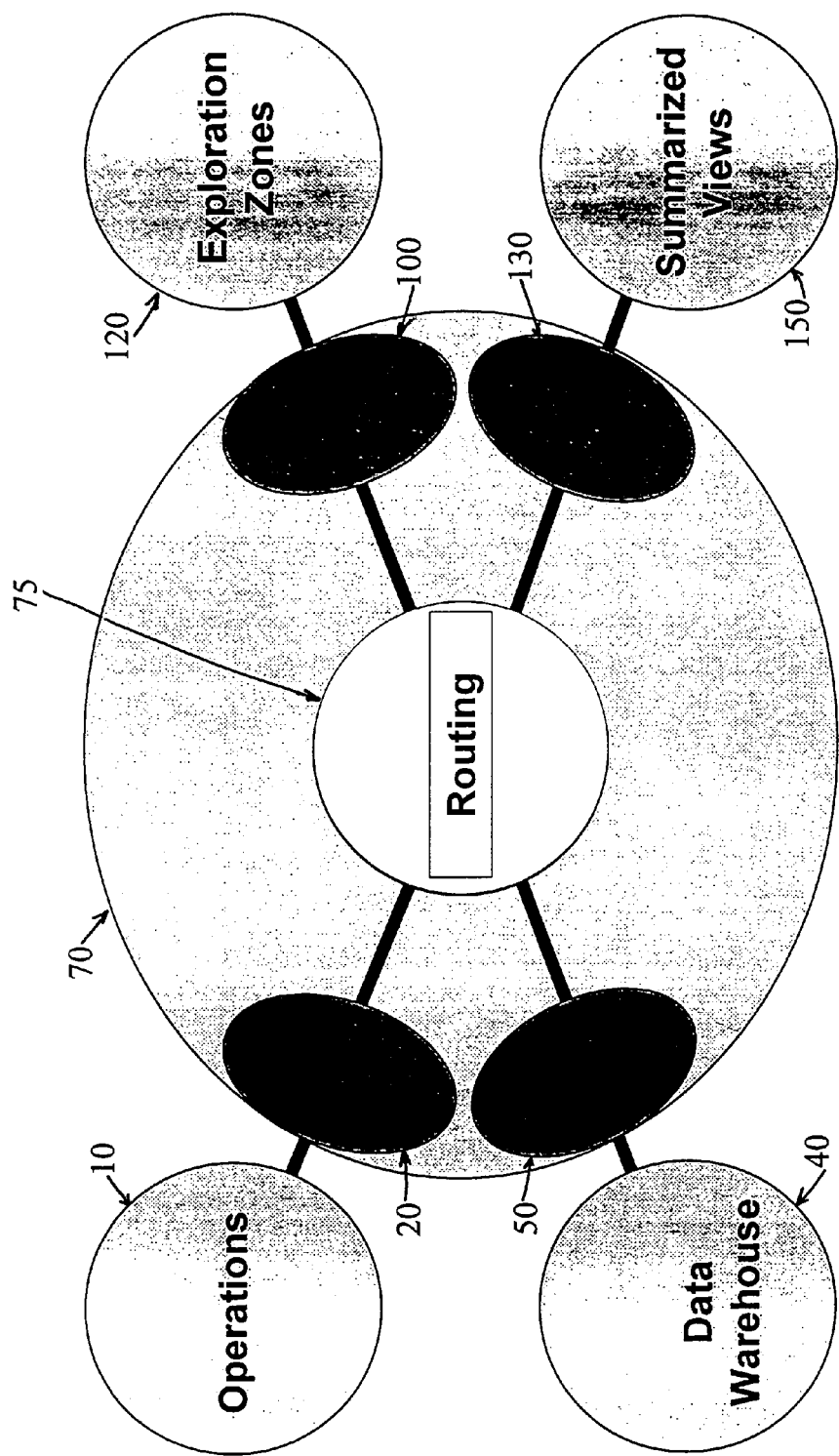
FIG. 3 depicts a Distributed ETL architecture.

FIG. 3 depicts an embodiment of the Distributed ETL architecture of the current disclosure. Distributed ETL is comprised of two parts. First, a set of distributed "thick spokes" 20, 50, 100 and 130 which provide pre-routing information processing specific to sources connected by input spokes and post-routing information processing specific to targets connected by output spokes. Second, a spartan router component 75 serves as a central core by connecting the input and output thick spokes. Preferably, all shared information in the enterprise will flow through the router component. In concept, the router reads incoming messages, determines what targets need those messages, and sends the messages to those targets. If more than one target needs a single message, each target receives a duplicate message.

The "thick" spokes 20, 50, 100 and 130 are used to manage specific source/target information processing (also referred to as staging processes, which comprise extraction, transformation, adaptation, and loading functions) as may be required prior to and/or after routing of the information. In contrast, the router component 75 is spartan in that it primarily manages delivery (i.e., routing) the information and does not perform processing steps thereon. Staging processes that are specific to a source or target are pushed out closer to where the spoke connects to that source or target, in contrast to being performed by the router component. By isolating the router component to purely delivery functions, the entire architecture is streamlined, enhancing its speed, efficiency, parallelism, and scalability. In sum, in one embodiment, the architecture of the present disclosure comprises: 1) the staging processes to manipulate the information (in the "thick" spokes), and 2) the spartan router component to deliver the information. Therefore, the overall architecture can best be referred to as a Distributed ETL (extract, transform and load).

Figure 4:
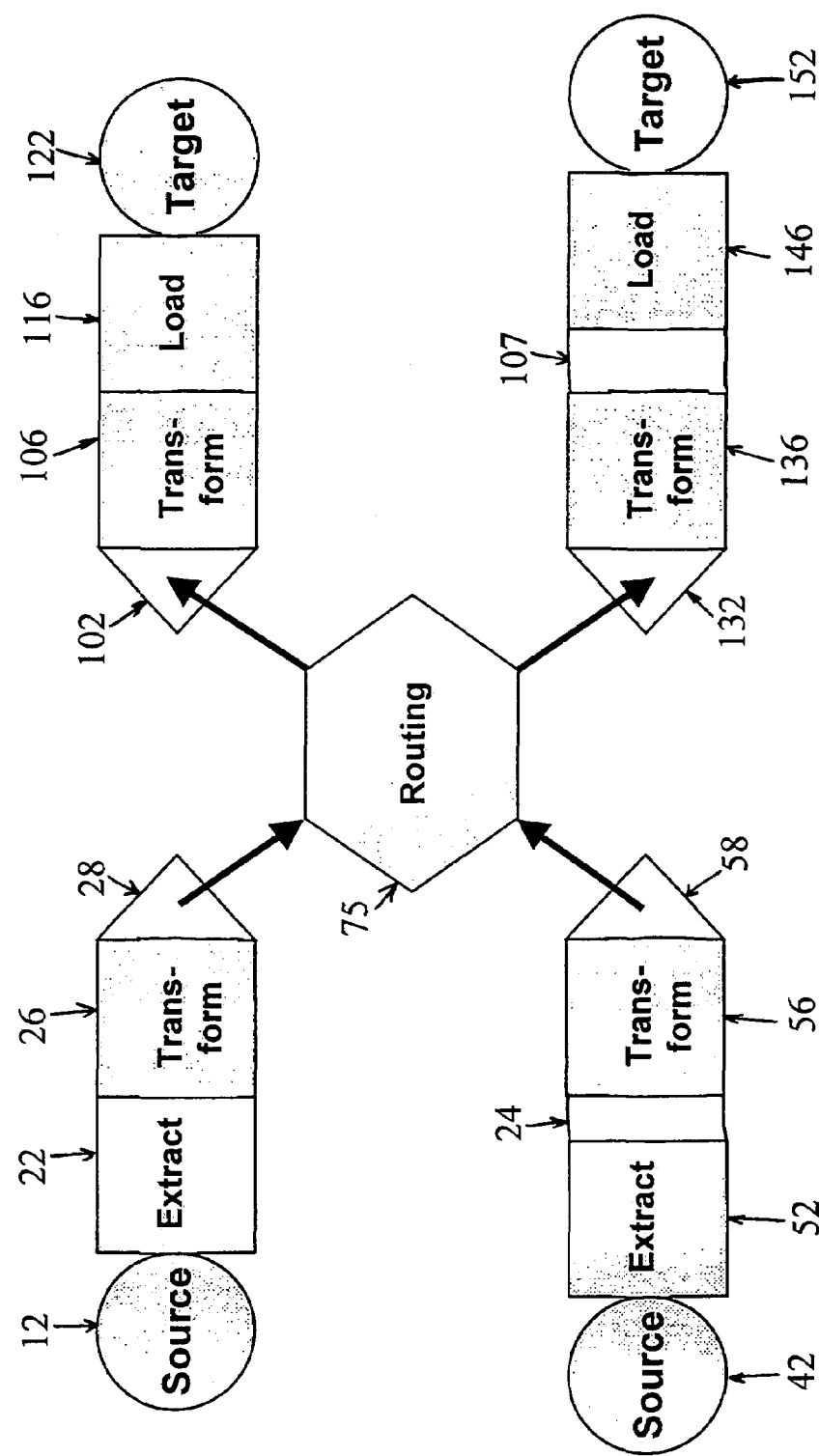
FIG. 4 is a diagrammatic representation of a staging area.

The staging processes, or the "thick" spokes of the Distributed ETL, are comprised of several software components to process information as necessary prior to and/or after routing it. Referring to FIG. 4, a Distributed ETL architecture is shown wherein information is being routed from any one of two information sources 12 and 42 to any one of two information targets 122 and 152. Any operable number of information sources and targets can be linked using the Distributed ETL of this disclosure, and the number of sources and targets shown in FIG. 4 was chosen for convenience purposes only. On the information source side of the router component 75 (i.e., the source "thick" spoke), the Distributed ETL comprises extract components 22 and 52; transform components 26 and 56; and source adapter components 28 and 58. On the information target side of the router component 75 (i.e., the target "thick" spoke), the Distributed ETL comprises target adapter components 102 and 132; transform components 106 and 136; and load components 116 and 146. Additional adapter components 24 and 107 may optionally be used on the source spoke and the target spoke, respectively. Combined, these components insolate the information sources and targets from the router component and provide a standard interface for the router. In concept, an adapter is an asynchronous component that provides a buffer between the router and connecting spokes.

The first step, beginning at an information source location 12 or 42 involves the extraction of information by the extract component 22 or 52. The extract component is a software program that functions as a connector to an external information source for retrieving information from the source. Information can be pulled or pushed from the source, and preferably the source pushes the information to the Distributed ETL environment. In most cases, it is desirable to retrieve only updates, revisions, changes and the like to the information ("information changes"), as this limits the amount of information that needs to be delivered to the targets. Methods to extract the information changes from the source include:

1. A full extract of the source information is created, which is then compared against a previous full extract that was created at an earlier point in time. A detailed comparison between the two extracts generates the list of information changes.
2. A relational database management system (RDBMS) creates a log of all changes made to the database. This log can be read periodically to obtain the changes made to the source information.
3. The RDBMS can utilize what are called "triggers" that perform actions when certain data tables are affected and identified conditions occur, pushing the information changes to a table or queue (a data structure in which elements are removed in the same order they were entered) that may be accessed for processing. The principal disadvantage to this approach is that it often loses transactional integrity. For example, where a single transaction for a customer spans several related tables, triggers looking for changes to only a single table may lose sight of the relationships needed to define all of the information changes.
4. The RDBMS can use a trigger to execute a "stored procedure" to capture information changes. In this case, the trigger executes when it senses a key relation change, and initiates a programmed stored procedure that gathers all information relevant to a logical transaction, based on the business rules for relationships contained in the referential integrity of the database design. The stored procedure then passes the information changes to the Distributed ETL with full transactional integrity.

The extracted information is then passed from extract component 22 or 52 to the transform component 26 or 56, respectively. Operational systems are the primary information sources in an enterprise and typically employ highly normalized data structures that optimize OLTP performance critical to real time, customer facing processes. Normalized data structures tend to use multiple tables to minimize recurring data forms and data redundancy. Data redundancy and recurring formats within records/rows can cause severe performance penalties in an environment having a high number of information updates. The fragmentation of normalized design, useful in operational systems, creates problems when shipping the information in a normalized format to remote targets. The target must know the business rules, or referential integrity, that logically ties the several table structures together as an integrated, functioning whole. In order to pass the normalized data in a message format, each piece of information must be tagged in a way that relates it to the other associated information so they can all be delivered together and assembled according to the master blueprint to a state of referential integrity, which is very impractical. Thus, in order to implement message based transport, denormalization of the data to some extent is required so that sufficient information is contained in each message to allow interested targets to easily identify and subscribe to events they wish to receive. This is the essence of packet based messaging, i.e., that each packet is self-addressed by the information contained within it. The denormalization process required to create these packets relies on transformation steps, with full knowledge of the source referential integrity rules (i.e., business rules governing the information structure).

The transform component's function is to perform transformations on the extracted information. As described above, transformation refers to the application of specific business rules governing the structure of the information. For example, captured information such as the price of a certain product and the quantity sold to a customer may need to be transformed. The desired form of this information might be the extended price. By applying the business rule for extended price, e.g., product price multiplied by quantity sold, the information has been transformed to the desired structure. Another example of information transformation is where a source captures customer names in the form of full name including the middle initial, e.g., John D. Smith. But, the desired form of this information for one specific target could be first and middle initials followed by the last name, e.g., J. D. Smith. Additionally, a different target may desire the same information in yet another format, such as last name first, followed by first name, followed by middle initial, e.g., Smith, John D. The last two examples demonstrate how two different targets can access the same source information and transform it in different ways that are acceptable to their business needs.

Transformations are used whenever the format of the information at the target, as defined by the business needs, does not match the format of the information extracted or arriving from the source. Stated alternatively, transformations are used to apply business rules that are common to the enterprise on the source side, and specific to the target on the target side. Typically, a source-side transformation is performed in order to facilitate packet based messaging, as discussed previously. Also, a target-side transformation typically is performed in order to facilitate the incorporation of information from multiple sources into a single target. In other words, a benefit of information targets is that they consolidate information from multiple sources, which frequently involves transformation. Even where a target receives information only from a single source, typically the target adds value by creating different perspectives of that information through aggregation and summarization, which also involve transformation. Where the target only displays detailed data without further transformation, such information may be read (i.e., queried) directly from an enterprise data warehouse, which typically has all source rules already applied. However, a data warehouse typically uses a normalized data structure, and thus a transformation may be required in SQL queries to return information in a meaningful format.

The transformed information is now ready to be delivered to the target but must first pass through the source adapter component 28 or 58. The transformed information may be stored temporarily in a queue known as a source adapter queue or a data store provided by a source spoke (to be covered in further detail later). A source adapter queue is a queue that provides input to a source adapter. This queue is written to only from a source spoke. This queue falls outside of the Event Broker domain. The zone between source adapters and target adapters, including the router, is labeled the Event Broker domain. All information moving through this area is processed as events, from the point that the source releases it to routing to a target adapter to aggregating the event for the target transformation spoke. A source adapter queue is typically used when the source wishes to publish new information in near real time. The source adapter component functions asynchronously as a connector to the router component 75 thereby isolating transformations from the router component and ensuring that the router component's primary function is delivery of the information (in contrast to the pre-routing information processing in the "thick" source spokes and the post-routing information processing in the "thick" target spokes). Herein lies (both for the source adapter and as discussed below, for the target adapter) the adapter component's primary function, to standardize and simplify the connection to the router component. The source adapter component 28 or 58 is implemented in software and wraps the transformed information in a standard message format, preferably a structured event format containing essentially header information with source identifier fields and a body which allows simple appending of the source data being carried within the message. Hereinafter, the adapted information is referred to as a message envelope. In summary, the source adapter receives the transformed information from either a source adapter queue or a data store provided by a source spoke and then passes it to a router queue. Source adapter operations will be described in more detail later in the disclosure, but in short typically include:

1. Enveloping the content.
2. Mapping to content definition.
3. Converting batch input to a message-based format to simulate events.

Queues

A queue has previously been defined as a data structure in which elements are removed in the same order by which they were entered. Queues can be defined to be "owned" by the process they provide input to. Therefore, queues in this disclosure are named to correspond to the type of process that reads it, and not according to the process or processes that write to it. For example, a router queue refers to the message queue that provides input information to a router component. Additionally, queues can be defined as either dynamic or static. A dynamic queue is a queue that interacts in a continuous mode with the router and is dynamically managed through router and target subscription tables. Dynamic queues include the router, router transfer, and target adapter queues. A static queue is a queue that does not interact with the router and is therefore statically created and maintained. Static queues include the source adapter and target spoke queues.

The message envelope is sent to a router queue by the adapter to await distribution via the router component 75. A router queue refers to the message queue that provides input information to the router component 75. This queue may be written to from either a source adapter (one-to-many) or a router transfer copy process (one). There is only one router queue for each router, therefore many different message types from multiple source adapter publishers can be expected in this queue. The source adapter must be intimately aware of content of the extracted and transformed information given that a single source may provide multiple types of information such as an addition, a revision, or a deletion of information. Because some targets may wish to subscribe to, or receive, only some of these information types, the source adapter must provide the specific information type for each message envelope sent to the router. To do this, the source adapter must have access to the business rules that define how to identify each type of information. For example, a certain code or date value may differentiate between an addition and a revision. Once the information type is identified, the source adapter tags the message envelope header with the proper message name (also referred to as the source ID) that will then be used for routing to the appropriate subscribing targets.

Metadata is used for control and management of information within the Distributed ETL application. Metadata is defined as "data about data" or facts about the information architecture within an organization. Metadata describes how, when, and by whom a particular set of information was collected, and how the information is formatted. Metadata is essential for understanding information stored in data warehouses, and the metadata is stored in a metadata repository. An example of metadata stored in the repository is transformation rules that describe how to move information from a transactional source database to a multidimensional target database and the aggregations and calculations that are applied to the information coincident to such a move. Another example of metadata in the repository is business rules (such as the definition of revenue or a common list of product codes) that multiple software components may want to access. Another example is when moving information from a source to a target, the metadata is checked to determine the appropriate characteristics of the data. For example, where a numeric field is required, an alphanumeric information piece would be rejected. When the adapter component detects such an error, the adapter may either route the information to an error queue rather than sending it on to the router component, or alternatively correct the information on the fly according to predetermined business rules. In sum, metadata helps provide transparent access to information.

Because the information processing within the thick spokes of the Distributed ETL runs in parallel, synchronization is important and can be accomplished by tracking the information with metadata. The source adapter component utilizes a metadata repository to provide a "road map" and rules for the information that it processes. The metadata stored within the metadata repository can be referred to as the content definition. Analogous to a COBOL copybook in a COBOL program, the content definition specifies the structure and naming conventions for the content, that is how specific fields are names, field sizes, formats, etc. within the record content. The key associated with this content definition that defines where in the metadata repository the full content definition can be found is referred to as the content definition identification (ID). These are the keys to the metadata and only the keys need to be passed through the router component rather than the whole content definition.

In a preferred embodiment, the target knows the source that it will be subscribing to in advance and simply references the content definition from the metadata repository when the target adapter is constructed. Thus, no content definition IDs (i.e., keys) need to be passed at all. Alternatively, where the content of each message may rely on a different document type definition (DTD) format, for example source information comprising extended markup language (XML) files, the key for the DTD may be sent with the message for retrieval on the target side rather than shipping the entire DTD with each message envelope. This significantly reduces the data transmitted and increases efficiency.

Figure 6:
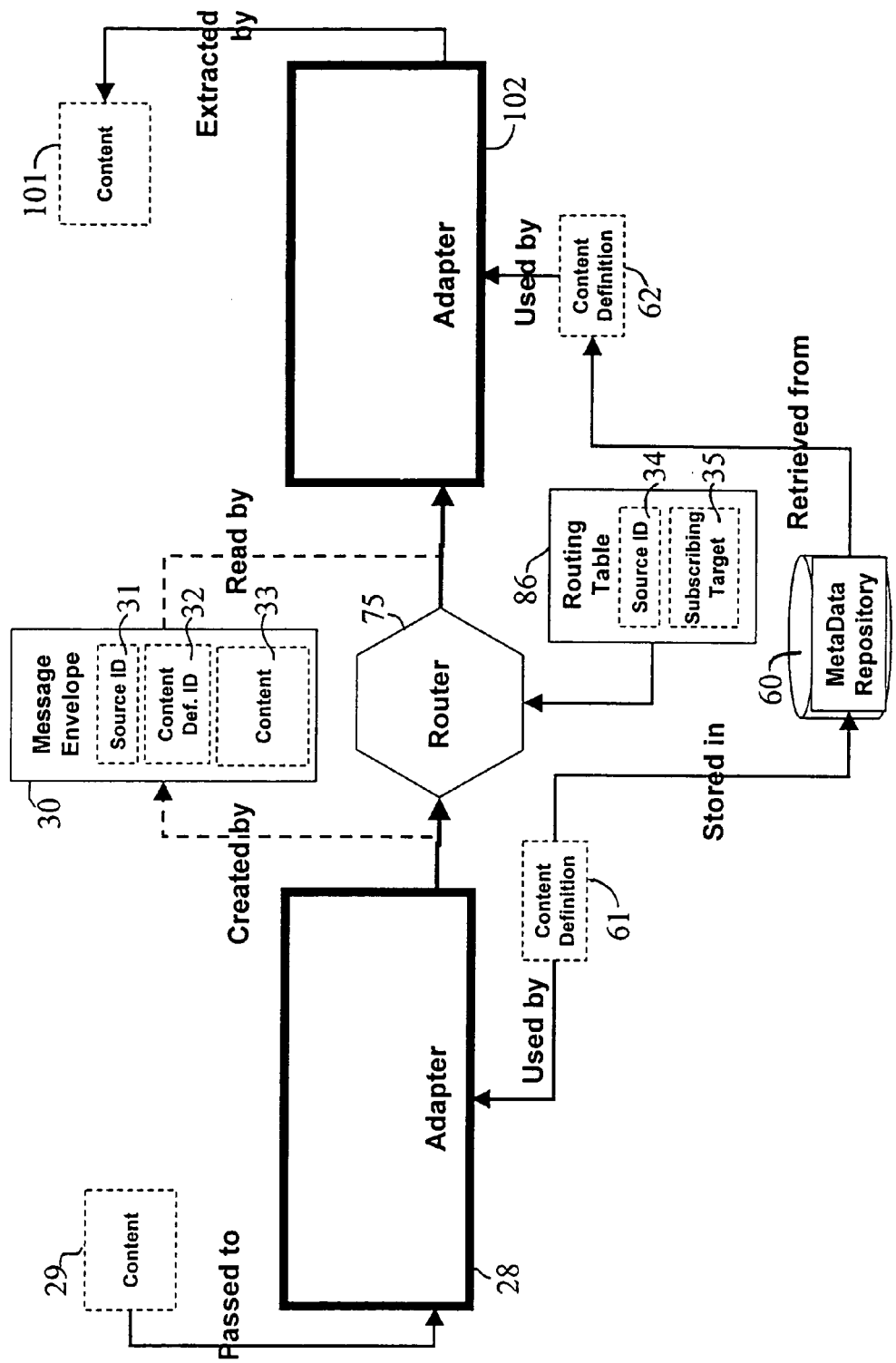
FIG. 6 depicts the utilization of the metadata repository by the adapter component of the Distributed ETL application and a parsing of the message envelope that is distributed by the router component.

The utilization of the metadata repository by the adapter components of the Distributed ETL application and a parsing of the message envelope that is distributed by the router component are depicted in FIG. 6. The source adapter component 28 pulls the content definition 61 from the metadata repository 60. The source adapter then uses the content definition 61 to help process the transformed information (referred to as content 29) passed to it from the transform component as previously described in FIG. 4. The content is the information extracted from the source, expanded and/or modified by the transform, and its definition is stored in the metadata store. Preferably, the content definition is defined and stored prior to the processing of any information by the source adapter. The source adapter 28 creates the message envelope (using a structured event format) by performing simple mapping of the content to a uniform format and by building header information such as the message name and source ID, which is used to route the message envelope.

Figure 5:
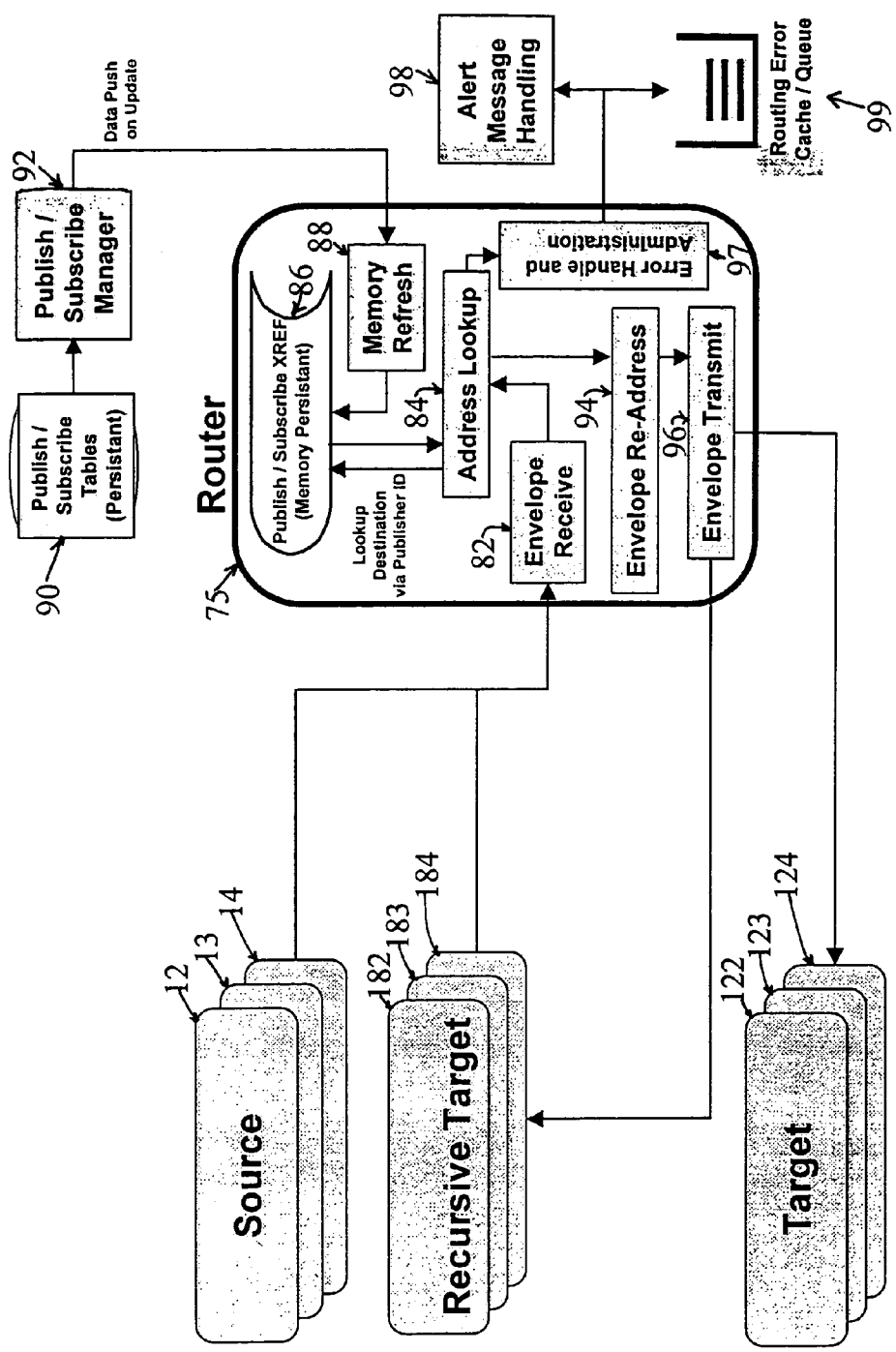
FIG. 5 is a detailed diagrammatic representation of the router components.

The source adapter component 28 attaches a header to the content creating a message envelope 30. The header includes a source ID 31 used to route the content to the appropriate targets by the router component. The message envelope 30 may also contain the content definition ID 32 and preferably will include the content 33. The router component delivers the message envelope 30 by utilizing a router table 86 as shown in FIG. 5 and discussed below. The router table 86 is stored in local memory to do an address lookup to find the subscribing target 35 and match its source ID 34 with the source ID 31 in the message envelope 30.

Referring to FIG. 4 on the exiting side of the routing function (i.e., the thick target spoke), near the target or targets, target adapters 102 and/or 132 implemented in software read the queued output from the router component found in the target adapter queue and remove the envelope from the distributed information. Referring to FIG. 6 the target adapter 102 retrieves the content definition 62 from the metadata repository 60 by reference to the content definition ID 32 of the retrieved message envelope 30.

In summary a target adapter is an adapter that receives information from a target adapter queue and passes it to a target spoke or target aggregator via a queue (to be discussed in more detail later). A target adapter queue is a queue that provides input to a target adapter and is written to only from a router. It may contain messages from multiple sources that the target adapter subscribes to. A target adapter's operations include:

1. Read queue.
2. De-envelopes content.
3. Maps to target format.
4. Filters by message content (optional).
5. Applies unique transformation logic on the current message being processed (optional).
6. Writes to a target spoke queue for immediate consumption if the business cycle is near real time (NRT).
7. Writes to a target aggregator queue for scheduled processing if the business cycle is not NRT.
8. When multiple message types are subscribed to by the target adapter, the message flow must be partitioned using the message name as the key, and the messages forwarded on to either corresponding logic paths and/or corresponding data stores. Generally the logic to de-envelope the message will be associated with the target-specific mapping, so the partitioning is better performed prior to the de-enveloping step.

Referring to FIG. 4, transformations can be made in the target thick spoke (i.e., post-delivery by the router component), if necessary, according to the target requirements, with an additional transform component 106 or 136. The information is then passed to the respective load component 116 or 146. The load component preferably uses an Application Programming Interface (API) software function to load the information into the target 122 and 152. An API is useful to abstract the load operation from the specific characteristics of a given physical datastore/file. In a typical embodiment, the target is a data warehouse and/or a data mart.

Multiple adapters are possible in the source and target thick spokes, as shown in FIG. 4. On the source side, additional source adapter 24 is shown between the extract component 52 and transform component 56. On the target side, additional target adapter 107 is shown between transform component 136 and load component 146. These additional adapters allow for different technologies to coexist without requiring extensive and costly integration. For example, an additional adapter may be used on the source side for transporting an extracted file to a different platform for transformation. Another example, an additional adapter may be used to enable a transactional system to flow events directly into a transformation process in near real time (shown as process 7 in FIG. 7).

The router component 75 is an important component in the Distributed ETL, because all information sources and targets are connected through it. The key function of the router component is to successfully route each message envelope from its publishing source to a single subscribing target or multiple subscribing targets. It is comprised of multiple software components that are message based, reading input from and writing output to message queues, such as the router queue or the adapter queue, and should be generalized to the extreme. Ideally, routing should be easy to change and require a minimal time to execute.

The router component 75 uses memory-based messaging to transfer information between publishing sources and subscribing targets. More specifically, messaging occurs on the source side between the source adapter and the router and on the target side between the router and the target adapter. In summary, information is extracted from a source and transformed. The adapter component creates the message envelope and publishes the source message to the router via a message queuing mechanism. The router subscribes to all source queues (for this reason referred to hereinafter as router queues) thereby receiving the message envelopes to be routed. The router performs a lookup in the routing tables using the source ID as a key. The router publishes the message envelope to one or more target destination queues, such as target adapter queues. The target adapter subscribes to a message queuing mechanism, unwraps the message envelope, and passes the information to a target transformation component. The information is then passed to a load component where it is written directly to the ultimate target. Linking distributed sources or targets with messaging functionality enables a minimum handling time per unit of information. Pairing transactional information extraction and loading with messaging enables near real time processing of extraction and loading functions.

Guaranteed message delivery as a part of the publish and subscribe functionality is important to ensure system reliability and verify that during exchange of messages no information packets are lost. When the network is available, messages will be delivered immediately. When the network is down, messages are still guaranteed to be delivered, eventually, but with some latency. In the latter case, middleware guarantees that messages are delivered as long as the network becomes available within a specified time period. In addition, messaging should provide the assurance of non-duplicate delivery, meaning the messages are only delivered once.

Messaging utilizes a queue system, which allows for a plurality of information sources to simultaneously publish to a router component inbox queue, or router queue, preferably where each of the sources is capable of publishing independently of the others. A source (via the extract, transform, and adapt components discussed previously) can publish to a router queue while the router component is subscribing to that router queue. Unlike a sequential file, the router component can read message envelopes from the front of the router queue at the same time that the source is publishing new message envelopes into the back of the router queue. This allows faster aggregate throughput than a traditional batch environment. A router component can then publish a message envelope to a subscribing target's adapter queue, which the target can access (as discussed previously with regard to the target adapter) and store for later retrieval matching its business cycle needs.

Performing its functionality in memory keeps the router component robust, as memory is hundreds to thousands of times faster to access than disk. Thus, it is preferred to use routing tables that can be maintained in memory for the control of routing destinations. The routing tables are backed up by persistent storage such that the tables may be reloaded to memory when the power is restored after a failure, or to update the content of the table when target subscriptions are changed.

FIG. 5 is a diagrammatic representation of the router components and functionality comprising the Distributed ETL architecture. The router component 75 receives a message envelope 82 from any one of multiple sources 12, 13, 14, 182, 183 or 184 through the thick source spokes and the router queue discussed previously. The message envelope is then passed to an address lookup 84 where a publish/subscribe cross-reference table 86 (also referred to as a router table) is accessed to determine where the message envelope is to be sent. The header on the message envelope identifying the publisher (i.e., source) corresponds to a list of subscribers (i.e., targets) in the cross-reference table 86 so the router component can determine the routing destination(s). The message envelope is then sent from Address Lookup 84 to Envelope Re-Address 94 where the target address is added to the message envelope. In an alternative embodiment, the source adapter automatically sends the message envelope to the router, which in turn routes the message envelope based upon the originating source (via the lookup table) and with the original source name intact. In other words, the target address is found in the lookup table and is not placed upon the message itself. The message envelope is then sent out to the appropriate target via Envelope Transmit 96. The output from the router component is written to an output queue, such as a target adapter queue or router transfer queue (to be discussed later), that will be read by an adapter component on the target side of the distribution function. Persistent Publish/Subscribe Tables 90 are updated through a Publish/Subscribe Manager 92, which provides a Graphic User Interface (GUI) configured for table management. These updates are sent to the Memory Refresh 88 to provide current entries in Publish/Subscribe cross-reference table 86. Addresses contained within the cross-reference table are stored in local memory within the router to quicken address lookup time. The Error Handle and Administration 97 handles errors by sending an error message, Alert Message Handling 98, and storing the errors in a Routing Error Cache/Queue 99.

In FIG. 6, downstream of the routing function another adapter 102 reads the message envelope 30. It uses the content definition 62 retrieved from the metadata repository 60 to extract the content 101 from the distributed information, as described previously. The information is subsequently processed in the thick target spoke on its way to the appropriate target as described previously in relation to FIG. 4.

Figure 7:
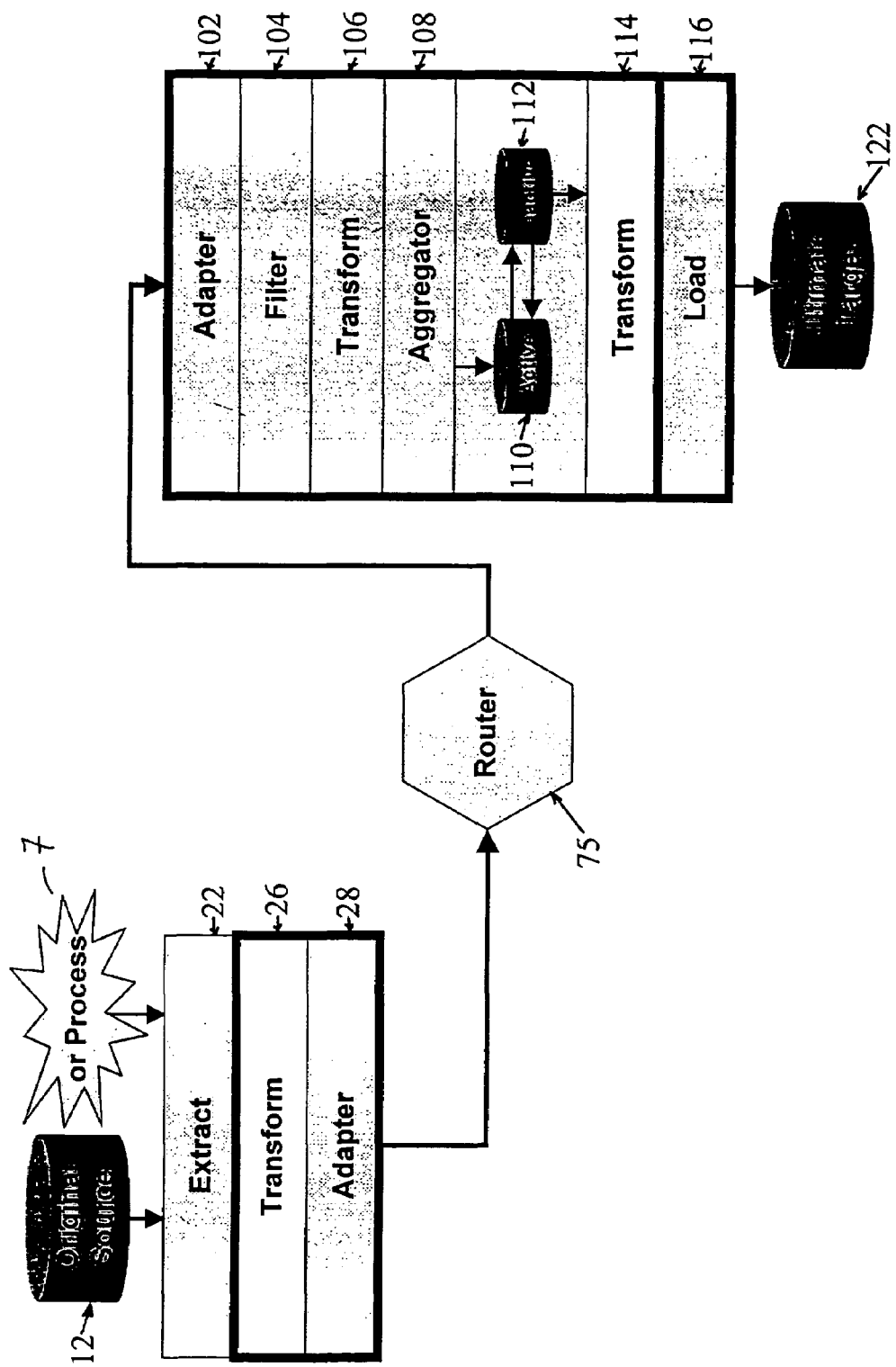
FIG. 7 is a more detailed diagram of the source and target spoke components.

FIG. 7 is a more detailed diagram of the components comprising the thick source and target spokes. As described previously, information is extracted from the information source 12 or process 7 by the extract component 22. The extracted information is passed to the transform component 26 where the information is transformed. The extracted, transformed information is sent through the adapter component 28 where it is wrapped in a message envelope and sent to the router queue for delivery by the router component 75.

On the output side of the router component 75, the adapter component 102 reads the information from a message queue, such as the target adapter queue, and takes the information out of the message envelope (removes the header). In a preferred embodiment, the source information (including the type of information such as an addition, deletion, etc.) contained within the message envelope is specific enough such that the router component can route the message envelope only to targets desiring (i.e., subscribing) such information, thereby eliminating the need for filtering. In a non-preferred embodiment, the adapter component 102 passes the information through an optional filter component 104. The filter component's function is to only accept information required by the target and to reject non-conforming information. The filtered information may now undergo more transformations by the transform component 106 that can be applied at the event level, i.e., one message at a time. In other words, all information need not be made available at the same time such as sorting a group of records, all of which must be made available in order to perform the search. In contrast for example, a trunk code could be used in a message to perform a lookup and the trunk location returned to update the same record. Where the information has been acquired continuously over a period of time, the information in a preferred embodiment is passed to the time-period aggregator component 108. Here the information can be accumulated in an "active" partition or file and later retrieved by toggling the "active" partition 110 to an "inactive" state 112, allowing it to be read into the target transformation. The information can be held to accommodate a business time cycle, e.g., weekly or monthly reporting. When the partition is toggled to an inactivate state 112, the accumulated information can now be passed on for additional transformations by an additional target transform component 114 where necessary. This level of aggregation (in contrast to a time period aggregation) accommodates business aggregations, e.g. by region, product, salesperson, etc. as well as other transformation logic such as any matching operations if multiple information sources are received for consolidation. The information is then passed to the loading component 116 where the information is finally loaded into the target 122 typically as a batch process.

Figure 8:
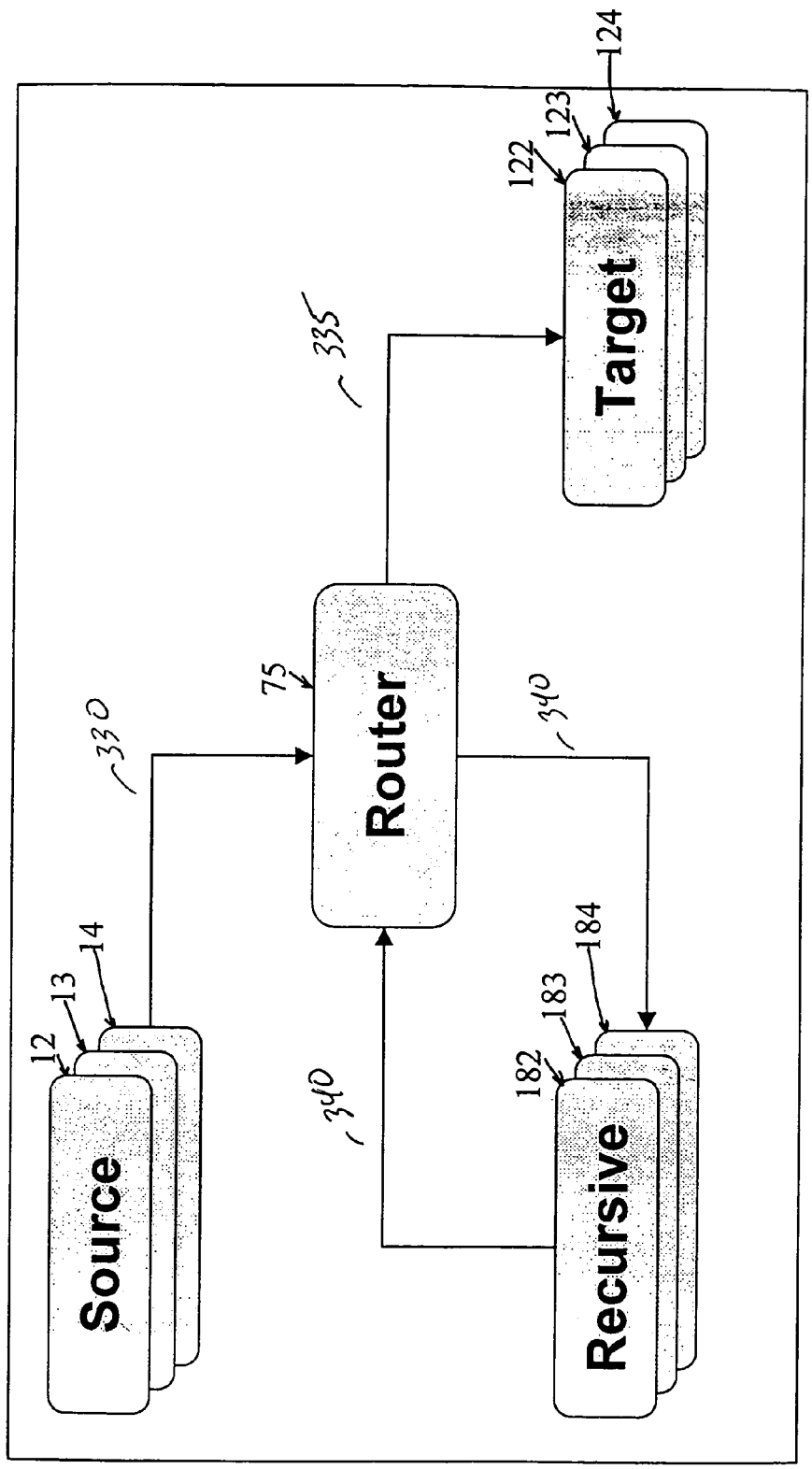
FIG. 8 is a diagrammatic representation of information flow with the Distributed ETL implemented on a single platform.

FIG. 8 is a diagrammatic representation of information flow on a single platform of a Distributed ETL. A single platform means that all the information sources and targets are routed through one router component. The single platform could represent a small company's information system or a portion of a larger company's information system. There can be multiple sources 12, 13 and 14 (connected to the router component by thick source spoke 330) and multiple targets 122, 123 and 124 (connected to the router component by thick target spoke 335). Note that targets can also be sources 182, 183 and 184 known as recursive targets, both receiving information through a thick target spoke 340 and sending information through a thick source spoke 340. A recursive target receives information from the router, adds some unique transformation value to the information and sends it back through the router to another specific target or targets. A recursive spoke does not send out the same information it receives. Information flow begins at the information source 12, 13 or 14 travels through thick source spoke 330 to the router component 75 and then on through thick target spoke 335 or 340 to either the information target 122, 123 or 124 or to the recursive target 182, 183 or 184, respectively. The uniquely transformed values from the recursive targets are then routed back through thick source spoke 340 to the router component 75 and on through thick target spoke 335 to the information target 122, 123 or 124.

Figure 9:
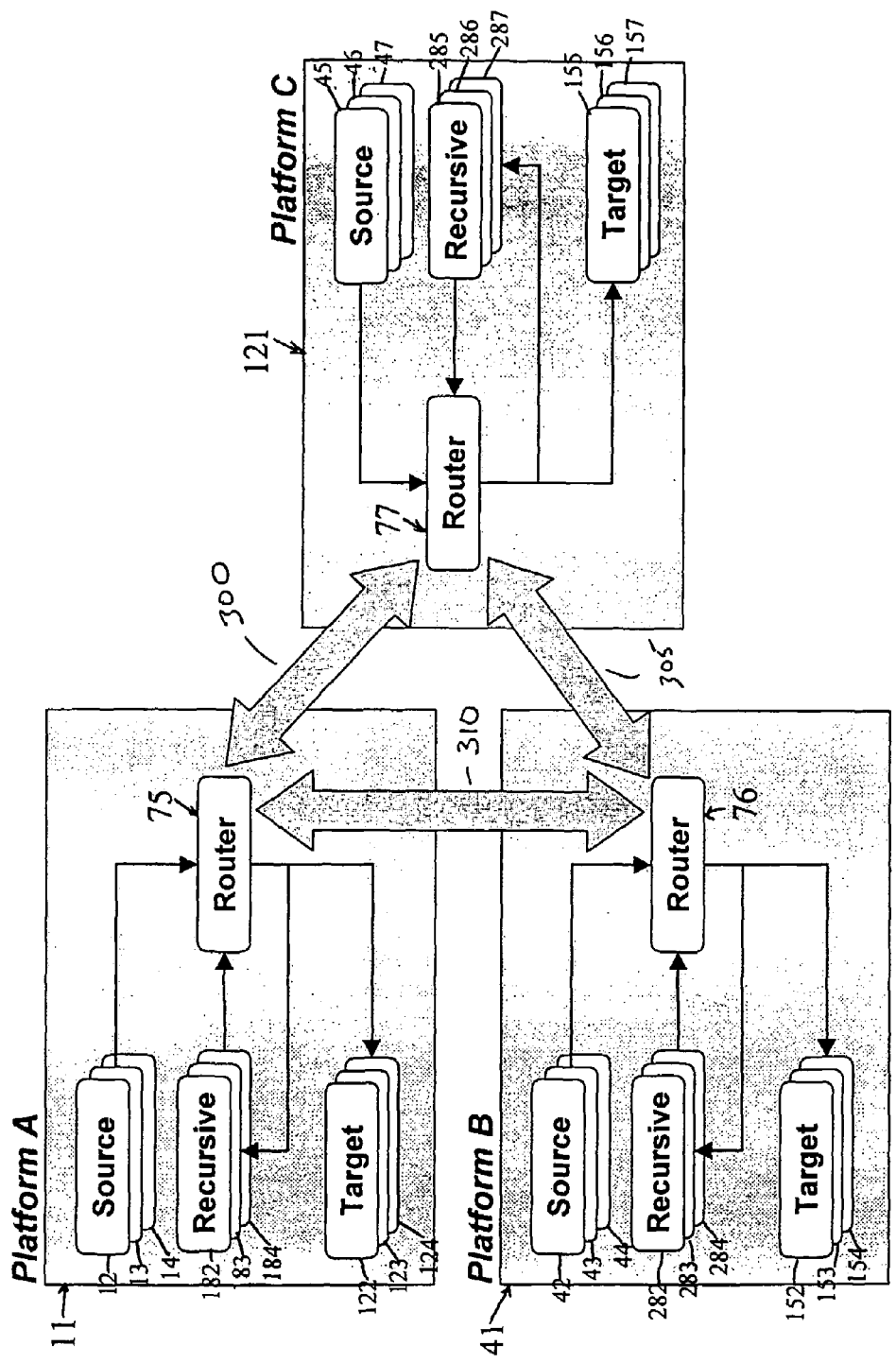
FIG. 9 is a diagrammatic representation of a preferred embodiment of the Distributed ETL routing across multiple platforms.

In contrast to the single platform structure of FIG. 8, FIG. 9 is a diagrammatic representation of a preferred embodiment of the Distributed ETL routing environment across multiple platforms. A plurality of sources and targets 12-14, 42-47, 182-184, 122-124, 152-157, 282-287 within an enterprise can be logically grouped into multiple platforms as shown with platform A 11, platform B 41, and platform C 121. By introducing multiple routers 75, 76 and 77 into the overall architecture which deliver message envelopes to one another a represented by arrows 300, 305, and 310, better utilization of bandwidth between devices can further enhance efficiency as well as make the design easier to scale up to very large business intelligence integration systems.

Figure 10:
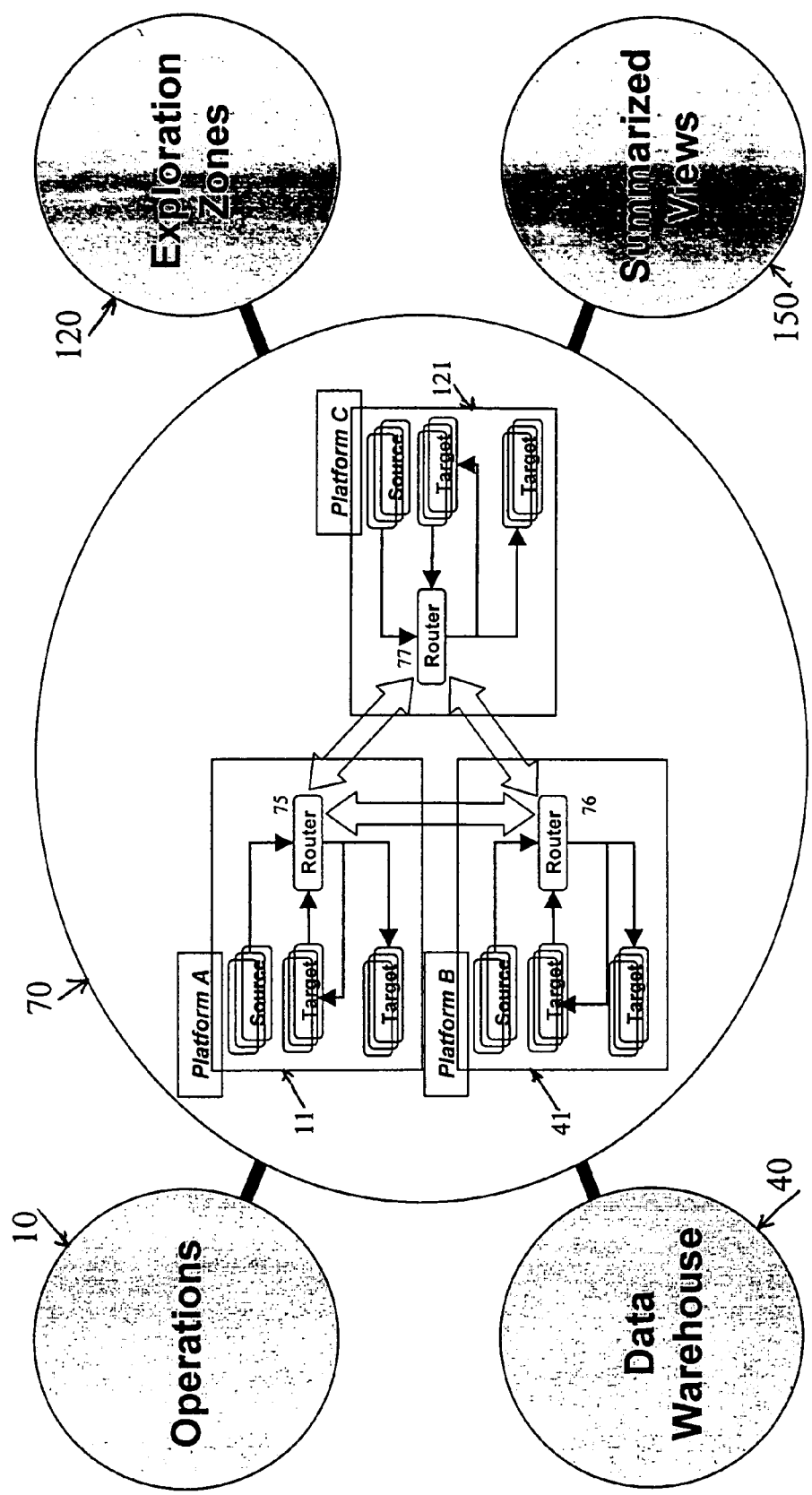
FIG. 10 depicts a general overview of how the Distributed ETL architecture integrates the various business enterprise information domains.

Integration of the various business enterprise information domains from FIG. 3 with the Distributed ETL architecture of FIG. 9 is depicted in FIG. 10. The information domains 10, 40, 120 and 150 link to a logical hub 70 to resolve their many-to-many relationships. Platforms A 11, B 41, and C 121 show the physical means by which this is accomplished within the logical hub. The physical platforms contain multiple source and target spokes, which could connect to any of the information domains. Information is shared between physical platforms through the routers that exist on each platform 75, 76, 77. FIG. 10 shows how the physical solution fits into the larger logical/conceptual picture.

In a typical embodiment, the information target comprises a data warehouse and a data mart. Since it can be quite cumbersome to access information from the data warehouse because of the large amounts of data and typically normalized data structures, a common IT design feature is to provide smaller information storage places that focus on a particular subject or department, called data marts. Historically, these can either be dependent data marts, which are subsets of the data warehouse, or independent data marts, which load information directly from operations (point to point). Data marts function to provide easier access to stored information. The data marts are highly indexed and optimized for query. Where one knows in advance the questions to be asked, data marts can be structured accordingly.

Legacy systems utilizing dependent data marts tend to be slow because it takes time to first load the data warehouse and then initiate another process to load the data marts. To reduce latency, an efficiency feature of the Distributed ETL disclosure loads information directly into 'co-dependent' data marts instead of the data warehouse. Co-dependent data marts are built using information that is dependent upon the same rules as the data warehouse but does not require the latency involved in writing to a data warehouse structure followed by extraction, transport and/or transformation and a final write to the dependent data mart.

Spokes

Figure 11:
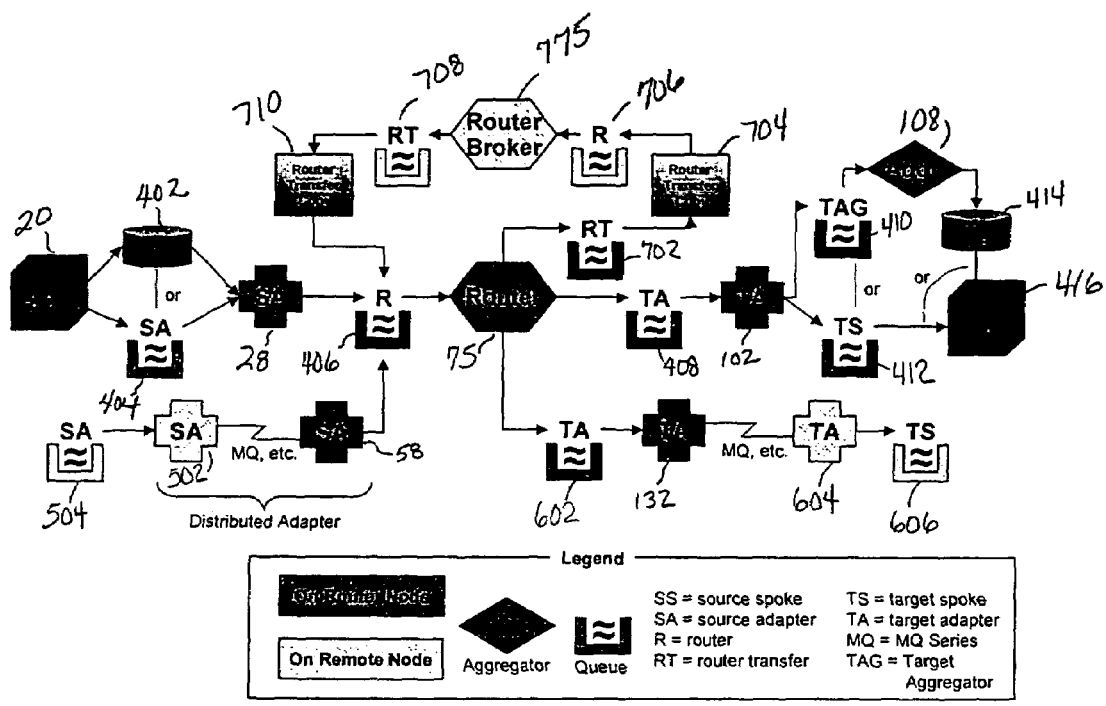
FIG. 11 depicts a more detailed diagram of the Distributed ETL architecture and includes routing and queue elements and locations.

FIG. 11 is a diagrammatic representation of an embodiment of the routing and queue elements and their location within the publish and subscribe architecture of this disclosure. In FIG. 11, the source spoke 20, on the left of the diagram, is not the actual information source itself. Additionally the target spoke 416 on the right of FIG. 11 is not the actual target. The actual source is the original source 12 and the actual target is the ultimate target 122 as shown in FIG. 7 (original source 12 and ultimate target 122 are not shown in FIG. 11). The original source 12, as well as the ultimate target 122, are external to the architecture disclosed to manage the publishing and subscription of information. However, the original source 12 feeds information into the source spoke 20 and the target spoke 416 feeds information into the ultimate target 122. Both the source spoke 20 and the target spoke 416 contain programs written in any number of available computer languages such as COBOL, SQL, or C++.

In FIG. 11, the source spoke 20 could be a main application program that is providing information to targets. This information can be shared throughout the enterprise. The source spoke 20 can deliver information in either one of two options. It can either deliver the information to a file or database in a data store 402 or it can put the information into a queue such as source adapter queue 404. The data store 402 and the source adapter queue 404 subsequently feed information to the source adapter 28.

If the type of information supplied by the source spoke 20 is of a transactional nature, the source spoke 20 would likely put the information into the source adapter queue 404. For example, when informational changes come in continuously, 24 hours a day, the individual changes can be continually input into source adapter queue 404 by source spoke 20 as they occur, on an event driven basis.

An inherent advantage of writing the transactional information to a queue is that as the information is written to one side of the queue it can be read from on the other side, creating a first in-first out approach. Subsequently, as the information becomes available, it can simultaneously be pushed out of the queue and immediately acted upon, taking the event toward near real time. This enables the system to become more of an ongoing process, moving away from a batch process. The extent to which this transition can occur within the architecture depends on the characteristics of the source system as to whether there is sufficient bandwidth available to write/read on every single transaction. Note that as the information becomes available it can be guaranteed by any queuing mechanism designed to guarantee that each record is going to reach its target once it is sent from the source system, for example, by MQ series.

In an alternate embodiment it may be desirable for the source spoke 20 to send information to a data store 402 instead of a queue 404, for ease of implementation. For example, a legacy system may typically send messages in cycles running once a day in a batch process and may contain many internal operations. In this situation, the source spoke may already be set up to provide an extract to the system. To simplify overall operations within the architecture, the source spoke 20 can publish the extract in batch form to data store 402, thereby reducing any further operations downstream.

There is a single source adapter for each source within the enterprise. Source adapter logic is uniquely designed for each spoke and accordingly, recognizes whether to pull information from either a data store or a queue. Therefore, source adapter 28 can read from either the source adapter queue 404 or the data store 402, depending on how it has been set up. The source adapter is constructed specifically to meet the requirements of the source spoke.

After the source adapter 28 pulls information from the source spoke 20 via either the data store 402 for batch processes or the source adapter queue 404 for transactional data, it bundles it in a manner that the router can recognize it. The source adapter puts a source label on the information to identify the origin of the information to downstream components. It also differentiates information according to various message types for example, additions or deletes, and tags each accordingly, making it possible to subscribe to a sub-set of such information. As described earlier, metadata can be utilized by the source adapter to tag information records with such identifiers. The source adapter 28 then passes the information into the router queue 406.

Note that it is desirable to be able to capture the metadata used by the source adapter, because this same information needs to be made available for the target processes. The source adapter uses the metadata to add labels, creating its own definition of the information coming from the source spoke. The target processes also require the metadata so they can access the formats that are stored therein and use them when requesting information. It is desirable for the subscribing targets to know not only what is being published but also what the published information represents, so that the subscribing targets can correlate their subscription requests to match the published information, thereby obtaining those records.

Distributed Adapters

Other information sources can feed into the router queue 406, such as information found on remote nodes, or platforms different from that of the router 75. In FIG. 11, the remote source adapter queue 504 feeds information from a source that is not shown to a distributed source adapter. The distributed source adapter is comprised of two adapter parts distributed across the nodes; one part, the remote portion of the source adapter 502, and the other part, the local portion of the source adapter 58. In an alternate embodiment, the source adapter queue 504 could be a file or a data store as described above when discussing source adapter queue 404.

When spokes are remotely located on different platforms from the router, portions of the adapter functionality may have to be split between the platforms for functionality. For example, a source may not have access to the technology generally used on the router platform, and may be designed to use a technology available on the source platform to send the data to the rest of the adapter component that resides on the router platform. This creates a distributed adapter. It is generally beneficial to have at least part of the adapter on the router platform, as this provides a natural capability to communicate with off-platform processes (e.g. Ab Initio, MQ Series).

The distributed source adapters 502 and 58 can be distributed across different technologies, but the source adapter 58 should be written with a technology that can communicate with the router queue 406. The remote source adapter 502 links to the local source adapter 58, transferring its information across platforms to the local source adapter 58. Local source adapter 58 then puts the information into the router queue 406.

There are many ways available to move information between nodes. Some examples include using MQ series, rendezvous to co-rendezvous, an FTP connector, or a connect direct process. A key is to have common technologies on both nodes that can talk to each other, or to equip each node with an interface that can talk to the connecting technologies. The source adapters may contain a program to handle messaging across nodes or there may be a transfer copy to move the data across. It is desirable for the local source adapters on the router node to be able to communicate with the router queue 406. Some vendors, for example, Ab Initio, may have a connector available for MQ series that is built in. In any case, the remote node initiates getting the information from the source spoke and is going to do the initial formatting to push it to the router node. The local source adapter 58 on the router node would then put the appropriate label on the information coming from the source, and push the information on to the router queue 406.

A node is any related computing area or processing location running on one server with one operating system. Multiple nodes are located on different servers or platforms. They could be located on the same physical box, but would still have their own copy of the operating system and have their own uniquely different functions. A box is a server typically comprised of a single operating system but may house more than one operating system. Multiple nodes may also be located in different boxes. When they are in the same box it is usually for space saving reasons, and to enhance their manageability by minimizing the cooling and power required for each box. The adapter typically can run across multiple nodes. The router can typically operate across multiple boxes, multiple CPUs (central processing units), and multiple nodes.

Router Broker

The other source going into the router queue 406 in FIG. 11 is actually coming from another router on another node, router broker 775. In an embodiment, communication between computers located on different platforms can occur via a router broker architecture. The router broker provides an intermediate stop between routers on multiple platforms. A router broker is a router with a hierarchical function to distribute messages between routers. In concept, the router broker creates a central warehousing point to manage messaging across all the routers within an enterprise. A router transfer queue is defined for each router that the router broker connects to, including additional router brokers further up the hierarchy. A router broker can also function as a "normal" router to process messages from and to router and target adapter queues.

A router broker has a router level greater than 0. The highest router level assigned in the enterprise may be assigned to only one router broker. A router level is an integer value that describes a router's relative height in a router distribution hierarchy. A level 0 router connects only to a router broker above it (in addition to its own sources and targets). A level 1 or higher router connects to lower level routers below it and (if it is not the highest level in the enterprise) a router broker above it (in addition to its own sources and targets). The highest level in the enterprise for a router broker will be unique (i.e., if the highest level is a 3, there can be only one). This level connects to lower level routers below it (in addition to its own sources and targets). In the illustrated embodiment, Router 75 in FIG. 11 could be considered to have a router level of 0. Router broker 775 could be considered to have a router level of 1.

A router broker loop shown in FIG. 11 is comprised of router transfer queue 702, router transfer copy 704, router queue 706, router broker 775, router transfer queue 708, and router transfer copy 710. The information moving across the router broker 775 in this router broker loop has already been transformed and adapted and is therefore in the correct format, so the main process occurring involves simply a copying of messages to be sent out. Information is passed from the router 75 into the router transfer queue 702, where it is then picked up by the router transfer copy 704. The copy function occurs in the router transfer copy 704 and 710. A router transfer copy (RTC) handles router-to-router transfers by copying messages between queues across nodes. A router transfer queue is a queue that provides input to a router transfer copy process. This queue is written to only from a router. It is used when a router cannot deliver a message directly because another router serves that target. The router transfer copy process is distributed across multiple platforms. Part of it runs on the router broker 775 platform and part of it runs on the router 75 platform. There can be either one RTC per router queue (with multiple router transfer queues from sending routers), or one RTC for each router/sending router combination. In an alternate embodiment, a router could also handle the router transfer copy function.

Information is then passed from router transfer copy 704, to the router queue 706. The information is then picked up by the router broker 775 and passed into router transfer queue 708. Router transfer copy 710 then processes the information across platforms sending the information into router queue 406 for redistribution by router 75.

In an alternate approach to using a router broker, the router broker itself may have a dual function of routing messages to targets on the platform on which the router broker resides as well as routing messages between other routers on other platforms.

In an alternate embodiment, communication between computers located on different platforms can occur in a peer-to-peer architecture. In this scenario, messages are transferred between platforms via separate local routers on each platform. A local router is a router that exists on a single node. It connects only to a single inbound router queue, that connects one-to-many target adapter queues and router transfer queues (Router transfer queues exist only when more than one router exists in the enterprise). All of the connected queues share the same node as the router. The targets located on one platform, send messages through their local router, requesting published information from information sources located on a remote node by communicating with the remote router of the information sources. The remote router then gets the requested published information and sends it back to the router located on the target's node. In a peer-to-peer environment, routers from each platform should be able to communicate with all routers on every node throughout the enterprise. This requires bi-directional links between each router in the system.

A peer-to-peer embodiment could be shown in FIG. 11 by replacing the router broker 775 with a second router, creating the peer-to-peer messaging process. In this scenario, everything would look the same in FIG. 11 except that router broker 775 would be another router like router 75. Messages would continue in the same manner through the router transfer copies 704 and 710 and queues 702, 706, and 708. An advantage to this system is that the number of messaging logs going out can be reduced because everything can be put into one place. However, a disadvantage would be that dual links would be set up with each and every other router in the enterprise so that every time a new router is added to the system then a link to every other router would have to be established. Also, in peer-to-peer, there needs to be one router transfer copy for every single other router in the system. Due to the overwhelming traffic typically found within an enterprise a router broker architecture tends to scale better in terms of manageability than a peer-to-peer architecture. However, a router broker architecture can generate more unwanted traffic than in a peer-to-peer scenario.

In general, the router is the physical hub in the entire enterprise. Some vendors, such as Ab Initio, can configure their router component to run across platforms, which simplifies the router's ability to connect the source on one platform to a target on another platform creating a peer-to-peer architecture. In fact, that makes all sources and targets local, simplifying the operation configuration of the router. In a peer-to-peer architecture information can travel across the enterprise much more easily, with less load to the system, than using a router broker approach. Especially in systems where there are high volumes of traffic between nodes. However, it is not typically recommended to set up the enterprise architecture of this disclosure utilizing a router of this nature in a peer-to-peer architecture because of the inherent problems that can occur, such as if one of the platforms was to go down. The main problem here would be that nothing would likely work until the router could be reconfigured. Furthermore, once the router is reconfigured to exclude the platform that is down, another problem could occur as to where the messages designated for the part that is down should be sent. For the above reasons, the present architecture is designed to isolate the router into one environment and maintain a persistent queue to hold messages going to another environment, such as for when a platform is down. Therefore, it may be desirable to set up two queues on each platform, so that in the event that one platform goes down there is a persistent place to store messages. Otherwise, the systems could go into a cascading failure effect. Additionally, a router transfer copy process can also provide back up for when a platform goes down.

Target Side Processes

Router 75 in FIG. 11 can send information to three different queues. It can send information to the router broker loop via router transfer queue 702 as previously discussed, or it can send information to a local target via target adapter queue 408, or to a remote target via target adapter queue 602. Following the local aggregation process flow of information first, the target adapter 102 receives information from router 75 via the target adapter queue 408 and puts it into one of two queues, depending on whether the information is going to an aggregator or whether it is going directly to the target spoke. A target aggregator is a special case of a target spoke designed to store larger volumes of accumulating information to support batch processes. Whether the aggregation process is utilized depends on how the data is to be used. The aggregation process typically occurs within the same environment; it is not distributed across nodes. If the information is going to the aggregator 108, the target adapter 102 puts the information into a target aggregator queue 410. A separate queue for information going to the aggregator 108 helps to store the accumulating data until the aggregator can pick up the information that a target may be requesting. If the information is not going to the aggregator, the target adapter 102 puts the information into a target spoke queue 412. A target aggregator queue is a queue that provides input to a target aggregator. This queue is written to only from a target adapter. This queue falls outside of the "Event Broker" domain. It is typically used when the target wishes to have new information aggregated by the target's business cycle so the target can process it using a batch operation. A target spoke queue is a queue that provides input to a target spoke. This queue is written to only from a target adapter. This queue also falls outside of the "Event Broker" domain. It is typically used when the target wishes to process new information in near real time.

If the target spoke 416 requests information on a transactional basis or requests information that is event based or near real time in which aggregated information is not required, then the target adapter 102 would write them into the target spoke queue 412. The target spoke 416 could then read them directly from the queue. For example, the target adapter would write the information into the target spoke queue when writing to an operational data store, such as when the updates are nearly real time and there is not any significant aggregation required. The information would be read by date, and stored as individual events.

The target adapter 102 has well defined functions. The target adapter serves as an interface connecting the target spoke to the event broker or router. The target adapter reads information from a target adapter queue, such as target adapter queue 408, queues up a label, maps it to the target format, and puts it into either a target spoke queue 412 or a target aggregator queue 410. Operations include the following:

1. Reads queue.
2. De-envelopes content.
3. Maps to target format.
4. Filters by message content (optional).
5. Applies unique transformation logic on the current message being processed (optional).
6. Writes to a target spoke queue for immediate consumption if the business cycle is NRT.
7. Writes to a target aggregator queue for scheduled processing if the business cycle is not NRT.

When a target adapter subscribes to multiple message types, the message flow can be partitioned within the adapter using the message name as a key. Messages can then be forwarded to either corresponding logic paths and/or corresponding data stores. Generally the logic to de-envelope the message will be associated with the target-specific mapping, so the partitioning is better performed prior to the de-enveloping step.

The router is selective on the information that it sends out based on the label that the target is subscribing to and is in a sense operating as a business usage filter. This can be considered as one level of filtering based on certain "subscribed to" pieces of information. Another level filter can occur on a per message basis by the target adapter as mentioned above. For example, the target adapter can filter out records not needed by a requesting target by differentiating the content in information. Thereby, a target can subscribe to the lowest common denominator of record that it needs from the source. Some vendors, such as Ab Initio, have routers available that can route by content as well as by label or any combination of the two. In this instance, an alternate embodiment would allow a router with such enhancements to perform both levels of filtering just described by incorporating the command lines within the router's configuration file to perform the desired filtering.

Typically, there is one target adapter per target spoke, and the target adapter is designed accordingly to provide information to one queue that is either event based or that is aggregated. The target spoke may actually require several sources of information to perform its job. Therefore, there may be multiple target aggregators 108, each one building a separate aggregated file from the single target aggregator queue 410, with all the aggregated files (multiple data stores 414) going to a single target spoke. Any integration of the data occurs in the target spoke, or a recursive spoke. A recursive spoke is defined as a spoke where multiple input streams are integrated together for republication as an integrated data source. The information is written to a data store in a file based format to guarantee its persistence for integration purposes, otherwise the information may not all be available simultaneously as required. Integration of data will be addressed further in the discussion of FIG. 13.

The aggregator 108 pulls out information from the target aggregator queue 410 according to a specific business cycle based on the target spoke 416 request requirements. For example, if the target spoke 416 is designed to have information updates once a day, then the aggregator 108 will be essentially a batch job that is triggered once a day. It will pull a day worth of records and then put them into a file in data store 414.

The target aggregator 108 converts information received from a target aggregator queue 410 to a data store 414 for a target spoke 416 to process. Its primary function is to step event based information down to a standard time-period aggregate specified by the target spoke business cycle (daily, weekly, etc.). The development environment provides standard classes or shells for aggregators that can be modified by providing date or other parameters. Events are written to aggregate data stores that are not being actively used by the target process. Aggregators are indicated for business cycles other than NRT.

The aggregator is a time cycle collector, focusing on a business cycle aggregation as opposed to a business use aggregation. It does not aggregate by customer, or by ZIP Code. It is aggregated by the time period that the target spoke needs to process the information. The target spoke itself may do the business usage aggregation.

In an embodiment, the target spoke reads an entire flat file either from a data store or a queue. However, if reading from a queue, it would read through the entire queue in a batch mode. It is not designed to read a queue from the front to the back, so if it emptied the queue, it would simply stop reading. In summary, the target spoke reads from a batch interface.

Remote Node Targets

In FIG. 11, router 75 could also deliver information to a remote target (not shown) via a path to target adapter 602. Again, as mentioned previously, target adapter 602 could be a queue or a file. This data flow does not show an aggregation process step, but in an alternate embodiment, an aggregation process could occur at a remote location similarly as shown in the local node process above.

Information from the target adapter 602 is passed to two distributed target adapters, local target adapter 132 and remote target adapter 604 where the information is adapted in a similar but reversed fashion as described when discussing distributed source adapters 502 and 58. The remote target adapter 604 then passes the adapted information to the target spoke 606, where the information is then sent on to the remote information target not shown in FIG. 11.

Figure 12:
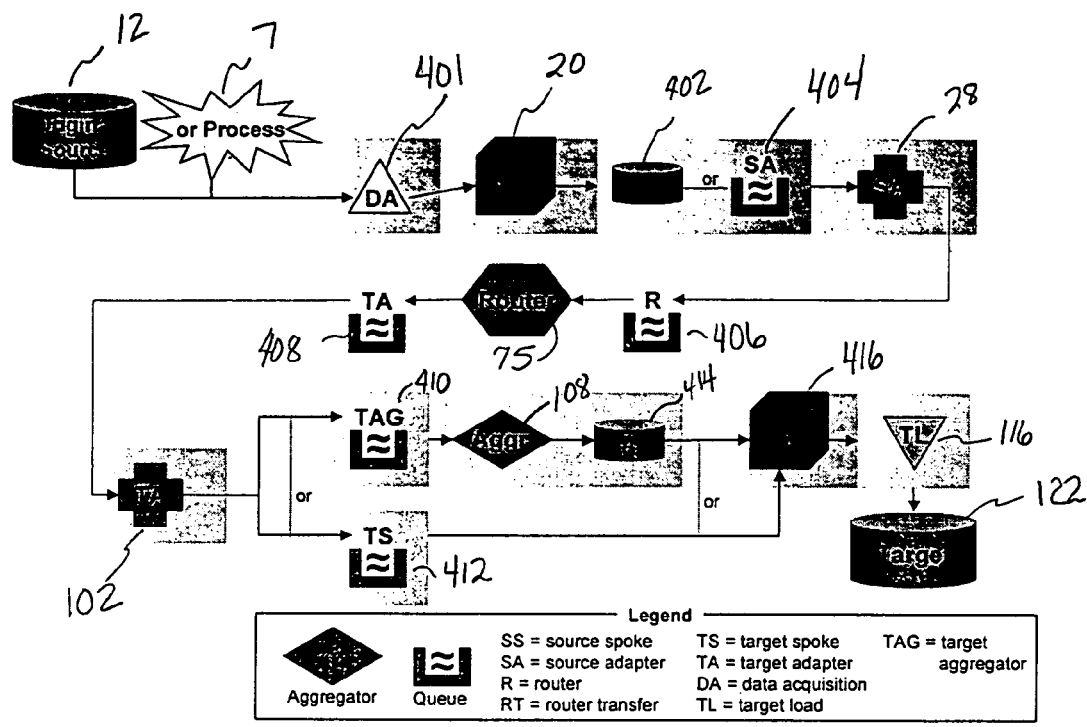
FIG. 12 depicts a more detailed break down of the individual source and target spoke components.

FIG. 12 is a more simplified version of FIG. 11 but is a more detailed version of FIG. 7. It depicts a single pathway through the enterprise architecture. Beginning on the left of the figure, the source information originates from either the original source 12 or process 7 and is moved to data acquisition 401. Process 7 is when the source is publishing information out to a messaging type process. Data acquisition 401 could either be a huge capture process, a more simple capture process that reads the information off a database to bring it in, or it could be some sort of a messaging type process that pulls information from the source.

The information is then passed from the data acquisition 401 to the source spoke 20 where the information is transformed. The transformed information is then passed from the source spoke 20 to the source adapter 28 via either a data store 402 or a source adapter queue 404 as previously described in the FIG. 11 discussion. The adapted information is then passed from the source adapter 28 into the router queue 406. The transformed, adapted, source information now in the router queue 406 is passed to the router 75 for distribution to the subscribing target 122. The router 75 routes the information down the appropriate path (there could be many paths out of the router that are not shown here) to the target adapter queue 408 and then on to the target adapter 102. The adapted target information is passed on to either an aggregator path or a non-aggregator path, depending on how the information is to be used. If the upper, aggregator path is taken then the target information is passed from the target adapter to the target aggregator queue 410 and then on to the aggregator 108 as previously described in the FIG. 11 discussion. The aggregator 108 aggregates the information according to the predetermined cycle and passes the information on to a data store 414 and then on to the target spoke 416 for transformation.

If the lower, queue path is taken then the target information is passed from the target adapter to the target spoke queue 412 and then on to the target spoke 416 for transformation. The transformed information is then passed into a target load 116. The target load 116 could be a process that operates on a scheduled basis, pushing information to the target 122 at a prearranged time. Typically, the load process can be separated from the transformation process in the target spoke 416 to avoid limiting when transformations can be run based on the time that the platform is available to load.

Data Integration and Republication

There may be certain places within an enterprise where it is desired that an integration of information take place in order to manage the overall system more effectively. There are two points within the disclosed architecture where data integration may occur. The two points of data integration are either within a target spoke or a recursive spoke.

When there are multiple targets that require rules that are common to more than one target, it may be more efficient to move the common rules to a primary source. One method is for the common integration rules to be implemented in a recursive spoke. The recursive spoke can then publish the integrated information as a new source information that the targets can subscribe to. Common rules should not be spread out among multiple locations. The rules are more efficiently stored in one place from where the common information can be distributed. During the planning and development stages of the enterprise system, identification of common logic found in targets can be placed into a recursive spoke. Note that modifications may be required to other targets to allow for the subscription to the newly integrated information.

The following examples are provided to describe how the data is integrated within a target spoke or within a recursive spoke using source information A and source information B as the two sources that require integration. A certain target requires having information A and information B combined, or integrated, in order for the target to perform its duty. Information from source A and source B are both sent to a target spoke and the information is integrated inside the target spoke. The target spoke would use certain business rules to integrate information sources A and B into information source AB. Alternatively, especially if there were many targets that required data integration logic, the source information A and source information B could both be fed into a recursive spoke. The recursive spoke would then do the integration, and publish the integrated information as source information AB. The new source information AB could then be subscribed to by another target spoke.

Figure 13:
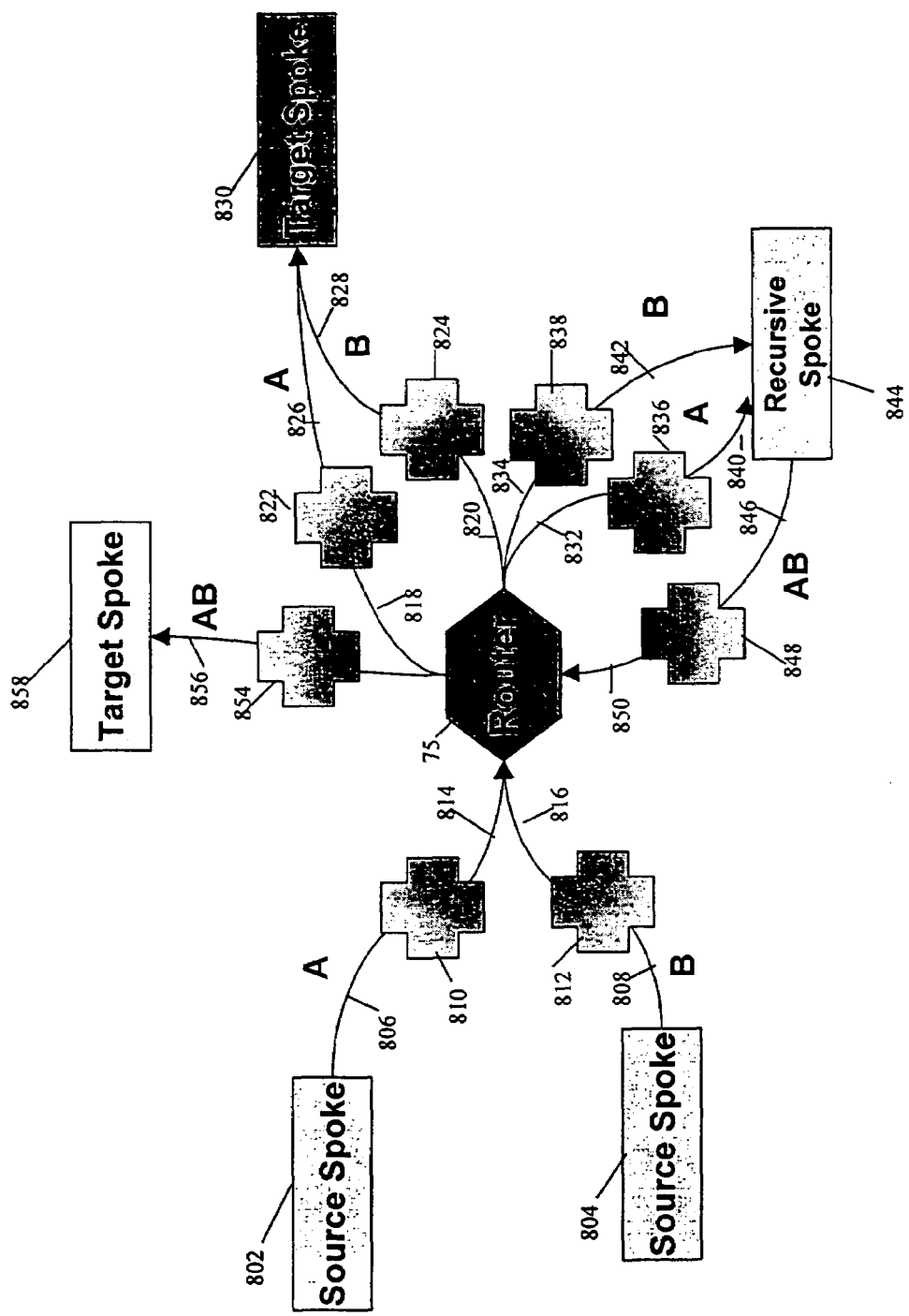
FIG. 13 shows integration processes using a target spoke and a recursive spoke.

FIG. 13 illustrates the above example showing the integration of information from two sources in either a target spoke or a recursive spoke and the resulting subscription process to the integrated information. Beginning on the left side of the diagram are the two source spokes: source spoke 802 containing information from an information source A that is not shown here and source spoke 804 containing information from an information source B that is also not shown. The information from information source A (called information A hereafter) is transformed in source spoke 802 and then follows path 806 to adapter 810. The transformed information A is adapted by adapter 810 and then follows path 814 to router 75. The information from information source B (called information B hereafter) is transformed in source spoke 804 and then follows path 808 to adapter 812. The transformed information B is adapted by adapter 812 and then follows path 816 to router 75 for routing.

There are many paths leading out of router 75 in FIG. 13. Information A and information B can be integrated in either a target spoke or a recursive spoke. Both options are illustrated in FIG. 13. For the integration to occur in a target spoke, information A is routed to target adapter 822 via path 818. The adapted information A is then sent to the target spoke 830 via path 826. Similarly, information B is routed to target adapter 824 via path 820. The adapted information B is then sent to the target spoke 830 via path 828. Both information sources are then integrated and transformed in target spoke 830 before being sent on to the ultimate subscribing target not shown in FIG. 13 that would be connected to target spoke 830.

Target spoke 858 requires the information from the two source spokes 802 and 804 to be in an already integrated form. In this instance, the integration may occur in a recursive spoke and then routed back through the router 75 making the integrated information available to multiple targets. The description of this process follows. Source information A is routed from the router 75 to adapter 836 via path 832. The adapted information A is then sent to recursive spoke 844 via path 840. Similarly, source information B is routed from the router 75 to adapter 838 via path 834. The adapted information B is then sent to recursive spoke 844 via path 842. Information A and information B are then integrated by recursive spoke 844, creating the newly published source information AB. Information AB then follows path 846 to adapter 848 where it is adapted accordingly and sent on to router 75 via path 850 for routing to subscribing targets. The information is routed to a subscribing target via path 852 to first be adapted in adapter 854. The adapted, integrated information AB then follows path 856 to target spoke 858 where the information is transformed before being sent to a connected subscribing target that is not shown in FIG. 13.

All information that is designated for a certain target goes through a single spoke connected to that target. In this embodiment, the target spoke provides the transformation that is required to send the information to the target. Optionally, transformation of information could take place on a per message basis in a target adapter as previously described. However, typically the transformation will occur within the target spoke itself. In a situation where multiple adapters lead to a target, only a single target spoke connects with the adapters. The target spoke is the location of the integration process; where the multiple inputs are joined together. Note that in FIG. 13 where there are two target adapters 822 and 824, there is still only one single target spoke 830 connected to them.

Summarizing, integration of information may occur in either a target spoke or a recursive spoke. When there is more than one target that is collecting information, typically, the information can be combined ahead of time in a recursive target so that the information can be processed, published, and distributed more efficiently and made available to targets sooner. A recursive element is a target that is also is a source; it may be considered to be the back end of the target spoke and the front end of the source spoke. Without recursive targets, some systems within the enterprise would become dependant upon the latency resulting from the information going through multiple systems as well as the associated operational priorities. The speed and efficiency of performing the integration in a recursive target reduces and possibly eliminates the latency for these systems.

Data Warehouse

In an embodiment, the data warehouse itself can be both a target and a source. The spokes connecting the data warehouse to the enterprise system can load information in to the data warehouse and at the same time publish the same information for further use throughout the enterprise. If an information source originating from the data warehouse is to be integrated with another information source before being sent back into the data warehouse, the procedure would typically be done in a separate recursive spoke before it is sent back to the data warehouse. In general, recursive spokes, as well as target spokes, contain unique logic for a specific rule implementation or integration. Differing logic may therefore require a multiple number of separate spokes.

For example, house-holding information that originates in the transforming processes and is, in some embodiments, loaded into the data warehouse may be associated with other customer accounts as one level of integration. The house-holding information may also be requested by several other areas within the enterprise that may require the information to be further combined to a second level of integration.

Typically, the information would first go through a house-holding recursive spoke before being sent back into the data warehouse to become source information for the other areas. Then the integrated house-holding information would undergo another level of integration in a different recursive spoke and then be sent on to the respective targets.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

I claim:

1. A method for delivering information to information targets within a computing environment having multiple platforms, wherein each of the multiple platforms is an information system accessing the remainder of the computing environment through a different router, comprising:
    a) extracting information from an information source;
    b) transforming the extracted information;
    c) isolating the transformed information by wrapping the transformed information into a message envelope having a standard format;
    d) delivering the message envelope to a router on a platform;
    e1) where the message envelope is targeted to an information target on the same platform as the router, routing the message envelope to at least one information target on the same platform;
    e2) where the message envelope is targeted to an information target on a different platform than the router, routing the message envelope to a second router acting as a router broker; the router broker then routing the message envelope to at least a third router located on the platform with an information target; the third router routing the message envelope to at least one information target on its platform;
    (f) unwrapping the message envelope to reveal the transformed information; and loading the transformed information into the information target,
wherein the extraction, transformation, and isolating steps (a)-(c), respectively, are isolated from the routing steps (e) such that the extraction, transformation, and isolating steps may be executed simultaneously for a plurality of information sources distributed across the computing environment to produce a plurality of message envelopes and wherein the subsequent steps are repeated for each of the plurality of message envelopes.

2. A method for delivering information to information targets within a computing environment having multiple platforms, wherein each of the multiple platforms is an information system accessing the remainder of the computing environment through a different router, comprising:
    a) extracting information from an information source;
    b) transforming the extracted information;
    c) wrapping the transformed information into a message envelope having a standard format;
    d) delivering the message envelope to a router on a platform;
    e1) where the message envelope is targeted to an information target on the same platform as the router, routing the message envelope to at least one information target on the same platform;
    e2) where the message envelope is targeted to an information target on a different platform than the router, routing the message envelope to a second router acting as a router broker; the router broker and then routing the message envelope to at least a third router located on the platform with an information target; the third router routing the message envelope to at least one information target on its platform; routing the message envelope to at least one information target;
    f) unwrapping the message envelope to reveal the information received;
    g) mapping the received information to a format required by the information target;
    h) transforming the received information; and
    i) loading the received information into the information target,
wherein the extraction, transformation, and wrapping steps (a)-(c), respectively, are isolated from the routing steps (e) such that the extraction, transformation, and wrapping steps may be executed simultaneously for a plurality of information sources distributed across the computing environment to produce a plurality of message envelopes and wherein the routing, unwrapping, mapping, transformation, and loading steps (d)-(i), respectively, are repeated for each of the plurality of message envelopes.

3. The method of claim 2 wherein the information is pulled from the source during the extracting step (a).

4. The method of claim 2 wherein the information is pushed from the source during the extracting step (a).

5. The method of claim 2 wherein the information extracted during step (a) comprises content changes to the source information at the time step (a) is performed as compared to the source information at a previous point in time.

6. The method of claim 2 wherein transforming the extracted information during step (b) further comprising applying one or more business rules to modify the extracted information.

7. The method of claim 2 wherein the message envelope further comprises an identification of the information source, a content definition identification and the content of the transformed information.

8. The method of claim 2 further comprising after unwrapping the message envelope, filtering the transformed information prior to loading the transformed information.

9. The method of claim 2 further comprising after unwrapping the message envelope, aggregating a plurality of transformed information and loading the aggregation of transformed information into the information target as a batch.

10. The method of claim 2 wherein the information target comprises a data warehouse and a data mart.

11. A method for delivering information to information targets within a computing environment having multiple platforms, wherein each of the multiple platforms is an information system accessing the remainder of the computing environment through a different router, comprising:
    a) extracting information from an information source;
    b) transforming the extracted information;
    c) isolating the transformed information by wrapping the transformed information into a message envelope having a standard format;
    d) delivering the message envelope to a router on a platform;
    e1) where the message envelope is targeted to an information target on the same platform as the router, routing the message envelope to at least one information target on the same platform;

e2) where the message envelope is targeted to an information target on a different platform than the router, routing the message envelope to a second router acting as a router broker;

e2a) where the message envelope is targeted to an information target on the same platform as the second router, routing the message envelope to at least one information target on the same platform;

e2b) where the message envelope is targeted to an information target on a different platform than the second router, routing the message envelope to a third router located on the platform with the information target; the third router routing the message envelope to at least one information target on its platform;

(f) unwrapping the message envelope to reveal the transformed information; and loading the transformed information into the information target, wherein the extraction, transformation, and isolating steps (a)-(c), respectively, are isolated from the routing steps (e) such that the extraction, transformation, and isolating steps may be executed simultaneously for a plurality of information sources distributed across the computing environment to produce a plurality of message envelopes and wherein the subsequent steps are repeated for each of the plurality of message envelopes.

12. A method for delivering information to information targets within a computing environment having multiple platforms, wherein each of the multiple platforms is an information system accessing the remainder of the computing environment through a different router, comprising:

a) extracting information from an information source;

b) transforming the extracted information;

c) wrapping the transformed information into a message envelope having a standard format;

d) delivering the message envelope to a router on a platform;

e1) where the message envelope is targeted to an, information target on the same platform as the router, routing the message envelope to at least one information target on the same platform;

e2) where the message envelope is targeted to an information target on a different platform than the router, routing the message envelope to a second router acting as a router broker;

e2a) where the message envelope is targeted to an information target on the same platform as the second router, routing the message envelope to at least one information target on the same platform;

e2b) where the message envelope is targeted to an information target on a different platform than the second router, routing the message envelope to a third router located on the platform with the information target; the third router routing the message envelope to at least one information target on its platform;

f) unwrapping the message envelope to reveal the information received;

d) mapping the received information to a format required by the information target;

e) transforming the received information; and f) loading the received information into the information target, wherein the extraction, transformation, and wrapping steps (a)-(c), respectively, are isolated from the routing steps (e) such that the extraction, transformation, and wrapping steps may be executed simultaneously for a plurality of information sources distributed across the computing environment to produce a plurality of message envelopes and wherein the routing, unwrapping, mapping, transformation, and loading steps (d)-(i), respectively, are repeated for each of the plurality of message envelopes.

13. The method of claim 12 wherein the information is pulled from the source during the extracting step (a).

14. The method of claim 12 wherein the information is pushed from the source during the extracting step (a).

15. The method of claim 12 wherein transforming the extracted information during step (b) further comprising applying one or more business rules to modify the extracted information.

* * * * *